US010884901B2

(12) United States Patent
Bhosale et al.

(10) Patent No.: US 10,884,901 B2
(45) Date of Patent: Jan. 5, 2021

(54) SYSTEM AND METHOD FOR CONFIGURABLE AND PROACTIVE APPLICATION DIAGNOSTICS AND RECOVERY

(71) Applicant: Microsoft Technology Licensing, LLC, Redmond, WA (US)

(72) Inventors: Santosh Vasant Bhosale, Bothell, WA (US); Manoj Ajith Prasad, Redmond, WA (US); Sparky Toews, Seattle, WA (US); Will Qian, Redmond, WA (US); Weizhu Chen, Kirkland, WA (US); Ganapathy V. Raman, Redmond, WA (US); Aritra DattaGupta, Redmond, WA (US); Aarohi Arora, Seattle, WA (US); Michael J. Nelson, Seattle, WA (US); Roger F. Johnson, Redmond, WA (US); Woo Ram Lee, Redmond, WA (US); Vladyslav Bazyliak, Bellevue, WA (US); Somak Mitra, Charlotte, NC (US); Bryan Wilhelm, Wesley Chapel, NC (US); Benjamin Reich, Charlotte, NC (US); Matthew Justice, Charlotte, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 200 days.

(21) Appl. No.: 16/111,764

(22) Filed: Aug. 24, 2018

(65) Prior Publication Data

US 2020/0065218 A1    Feb. 27, 2020

(51) Int. Cl.
*G06F 11/00* (2006.01)
*G06F 11/36* (2006.01)

(52) U.S. Cl.
CPC ........ *G06F 11/366* (2013.01); *G06F 11/3664* (2013.01)

(58) Field of Classification Search
CPC .......................... G06F 11/366; G06F 11/3664
See application file for complete search history.

(56) References Cited

U.S. PATENT DOCUMENTS 9,529,602 B1    12/2016  Swierk et al.
10,049,009 B2 *  8/2018  Boyapalle ............. H04W 76/14
(Continued)

FOREIGN PATENT DOCUMENTS

WO        0241105 A2    5/2002

OTHER PUBLICATIONS

"International Search Report and Written Opinion Issued in PCT Application No. PCT/US2019/039660", dated Oct. 11, 2019, 13 Pages.

(Continued)

*Primary Examiner* — Katherine Lin
(74) *Attorney, Agent, or Firm* — Fiala & Weaver P.L.L.C.

(57) ABSTRACT

Methods for configurable and proactive application diagnostics and recovery are performed by systems and devices. A diagnostics manager determines diagnostics packages corresponding to problems described in client device diagnostics requests. Session identifiers are generated and returned with diagnostics identifiers to clients which then provide the session identifiers and diagnostics identifiers to a service manager for session initiation. Diagnostics packages are located, retrieved, and provided back to the client by the service manager that invokes a client-side engine to execute diagnostics packages. Results are provided to the diagnostics system which determines additional packages to be executed by the engine during the same diagnostics session. Further, device-specific tokens are acquired by (Continued)

client devices which execute local diagnostic packages and acquire remote diagnostic packages for execution in the same session. Additionally, diagnostics packages provide their own user interfaces, and local packages are automatically executed upon invocation of help applications.

20 Claims, 11 Drawing Sheets

(56) References Cited

U.S. PATENT DOCUMENTS

| | | | |
|---|---|---|---|
| 2008/0126872 A1* | 5/2008 | Butcher | G06F 11/3664 714/38.1 |
| 2010/0205583 A1* | 8/2010 | Gebhardt | G06F 11/366 717/127 |
| 2011/0131295 A1* | 6/2011 | Jolfaei | G06F 11/366 709/219 |
| 2015/0289152 A1 | 10/2015 | Shanmugam et al. | |
| 2016/0335151 A1 | 11/2016 | Swierk et al. | |
| 2016/0350166 A1 | 12/2016 | Andrews et al. | |
| 2018/0129580 A1 | 5/2018 | Merkle et al. | |
| 2018/0225192 A1* | 8/2018 | Alagiriswamy | G06F 11/3466 |
| 2020/0065217 A1 | 2/2020 | Bhosale et al. | |

OTHER PUBLICATIONS

"Non Final Office Action Issued in U.S. Appl. No. 16/111,751", dated Apr. 29, 2020, 18 Pages.

"Non Final Office Action Issued in U.S. Appl. No. 16/111,751", dated Nov. 6, 2020, 9 Pages.

* cited by examiner

SYSTEM AND METHOD FOR CONFIGURABLE AND PROACTIVE APPLICATION DIAGNOSTICS AND RECOVERY

CROSS-REFERENCE TO RELATED APPLICATION(S)

The instant application is related to U.S. patent application Ser. No. 16/111,751 entitled "SYSTEM AND METHOD FOR CONFIGURABLE AND PROACTIVE APPLICATION DIAGNOSTICS AND RECOVERY," and filed on the same date herewith, the entirety of which is incorporated by reference herein.

BACKGROUND

Users often seek support for application and device problems. Support options include human support agents, frequently asked question (FAQ) resources, and support bots with which a user interacts to diagnose problems. These support options utilize user-supplied identifications and descriptions to diagnose and/or fix the reported problems. For example, a user may attempt to identify their specific problem from a list provided by the support agent that is based on the user's description of the problem, and the support agent then determines one or more possible fixes for the user to try against the selected problem. These prior solutions all involve much user interaction in addition to relying on user determinations for identifying and describing problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods for configurable and proactive application diagnostics and recovery are described herein. For example, the described embodiments provide for techniques and mechanisms used by user devices and diagnostics hosts which reduce the time and interaction required by users to diagnose and apply fixes responsive to request for diagnostics.

For instance, a diagnostics system is described that receives requests for diagnostics services from a user. A diagnostics manager of the system dynamically filters a diagnostics database according to client device information and a problem type to determine a diagnostics package that corresponds to the problem reported. The system generates a session identifier for the diagnostics session, and provides the session identifier and a diagnostics identifier for the determined diagnostics package. When the client device provides the session identifier and the diagnostics identifier to a service manager of the system to initiate the session, the diagnostics package is located, retrieved, and provided back to the client device, and the service manager invokes a diagnostics engine at the client device to execute the diagnostics package. Results of the executed diagnostics package are provided back to the diagnostics system which in turn automatically determines additional diagnostics packages to be provided to and executed by the engine during the same diagnostics session.

Furthermore, systems are described in which device-specific and/or device-bound tokens are acquired by client devices which execute a local diagnostics package in a diagnostics session. For example, token requests are provided for an identification token subsequent to a diagnostics request of a user. The identification tokens identify the user as well as the user's system. The tokens are used to acquire remote diagnostics packages for execution in the same session. Still further, diagnostics sessions may be automatically initiated based on a user's invocation of a diagnostics application. A diagnostics system may execute diagnostics packages without an explicit user request to determine whether any predefined problems exist at the user's device. Notifications are then provided to the user requesting consent to perform remedial actions in the diagnostics session for any identified problems.

Embodiments are directed to methods for the aforementioned configurable and proactive application diagnostics and recovery, and are directed to computer-readable storage medium having program instructions recorded thereon that, when executed by a processing device, perform such methods, as contemplated herein.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 4A:
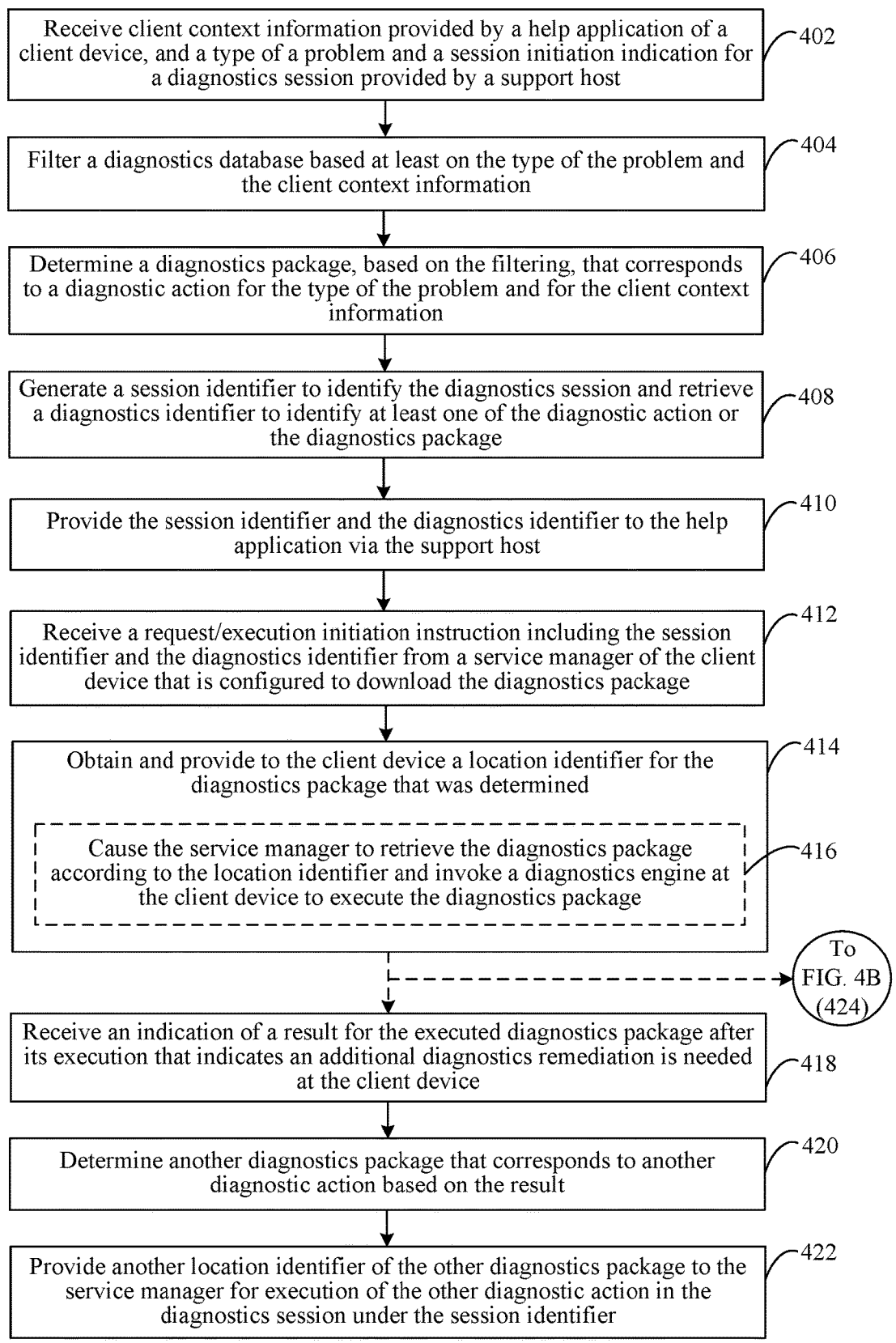
Figure 4B:
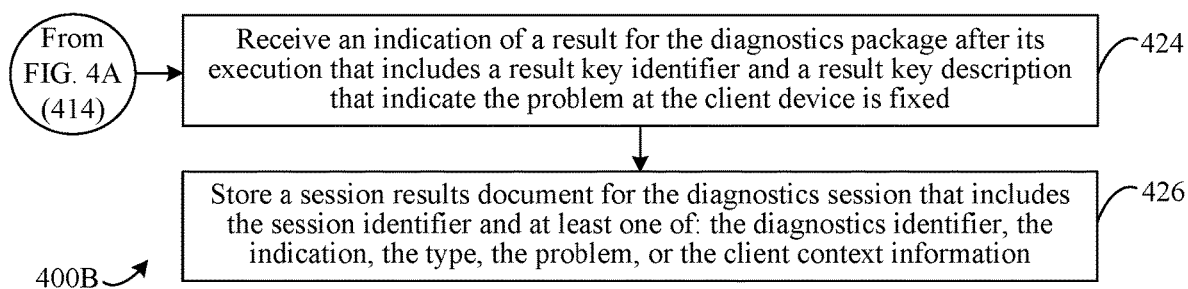

FIG. 4A and FIG. 4B each show flowcharts for configurable and proactive application diagnostics and recovery, in accordance with an example embodiment.

Figure 5:
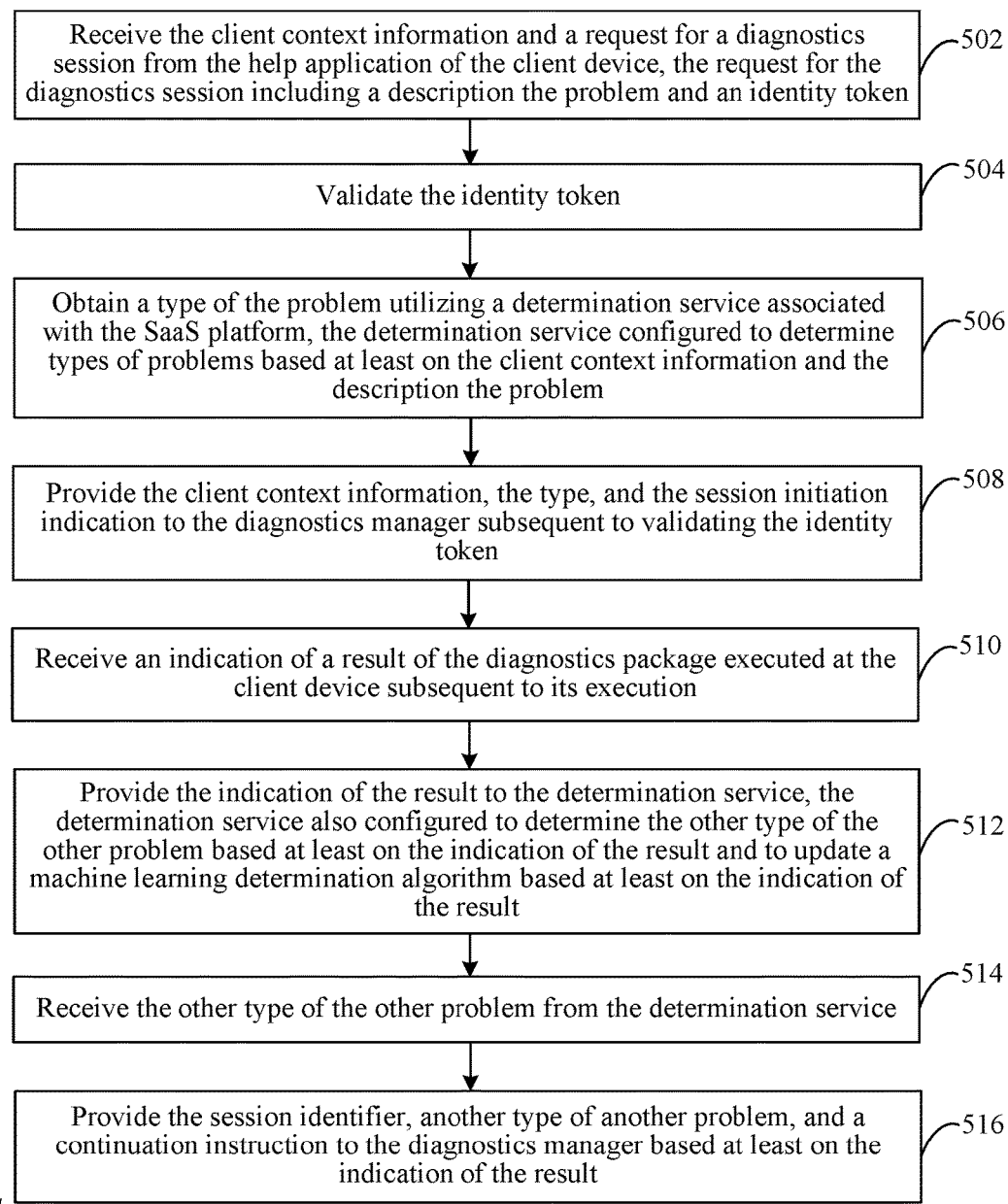

FIG. 5 shows a flowchart for configurable and proactive application diagnostics and recovery, in accordance with an example embodiment.

Figure 6:
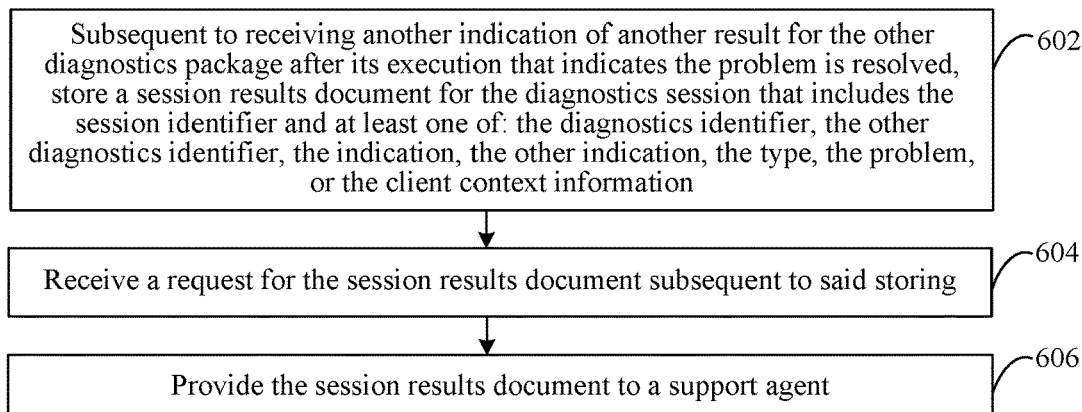

FIG. 6 shows a flowchart for configurable and proactive application diagnostics and recovery, in accordance with an example embodiment.

Figure 7:
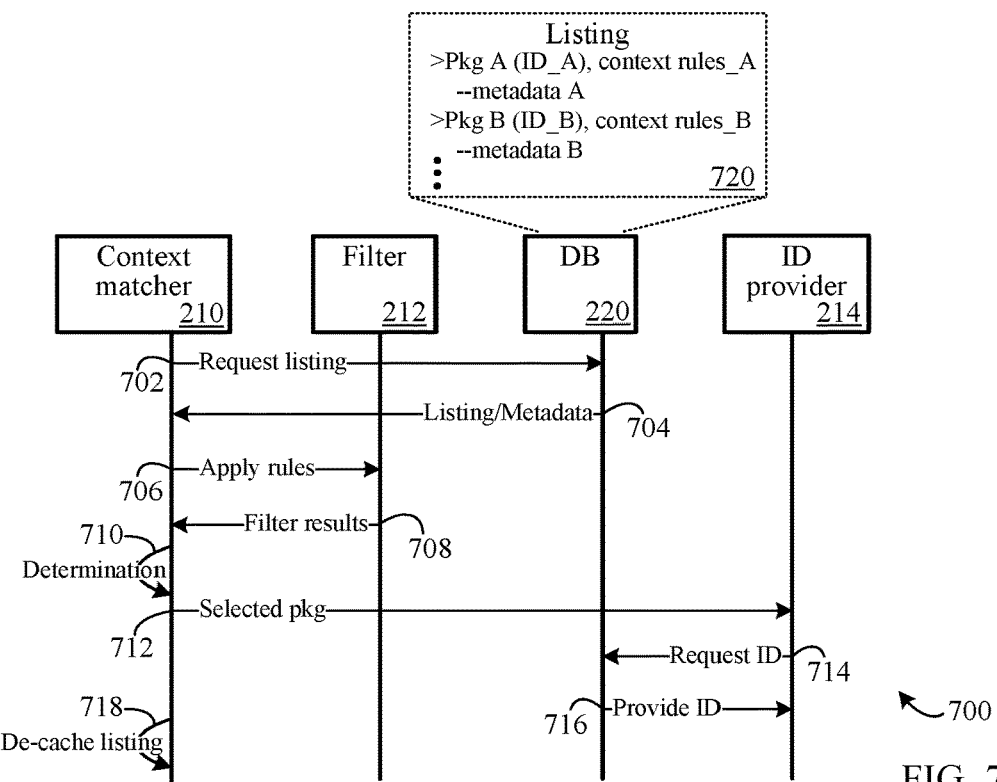

FIG. 7 shows a flow diagram for configurable and proactive application diagnostics and recovery, in accordance with an example embodiment.

Figure 8:
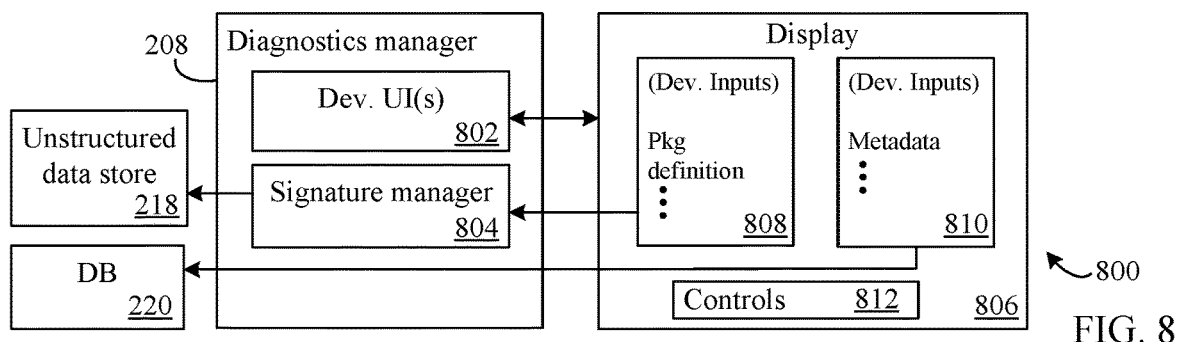

FIG. 8 shows a block diagram of a host system for configurable and proactive application diagnostics and recovery, in accordance with an example embodiment.

Figure 9:
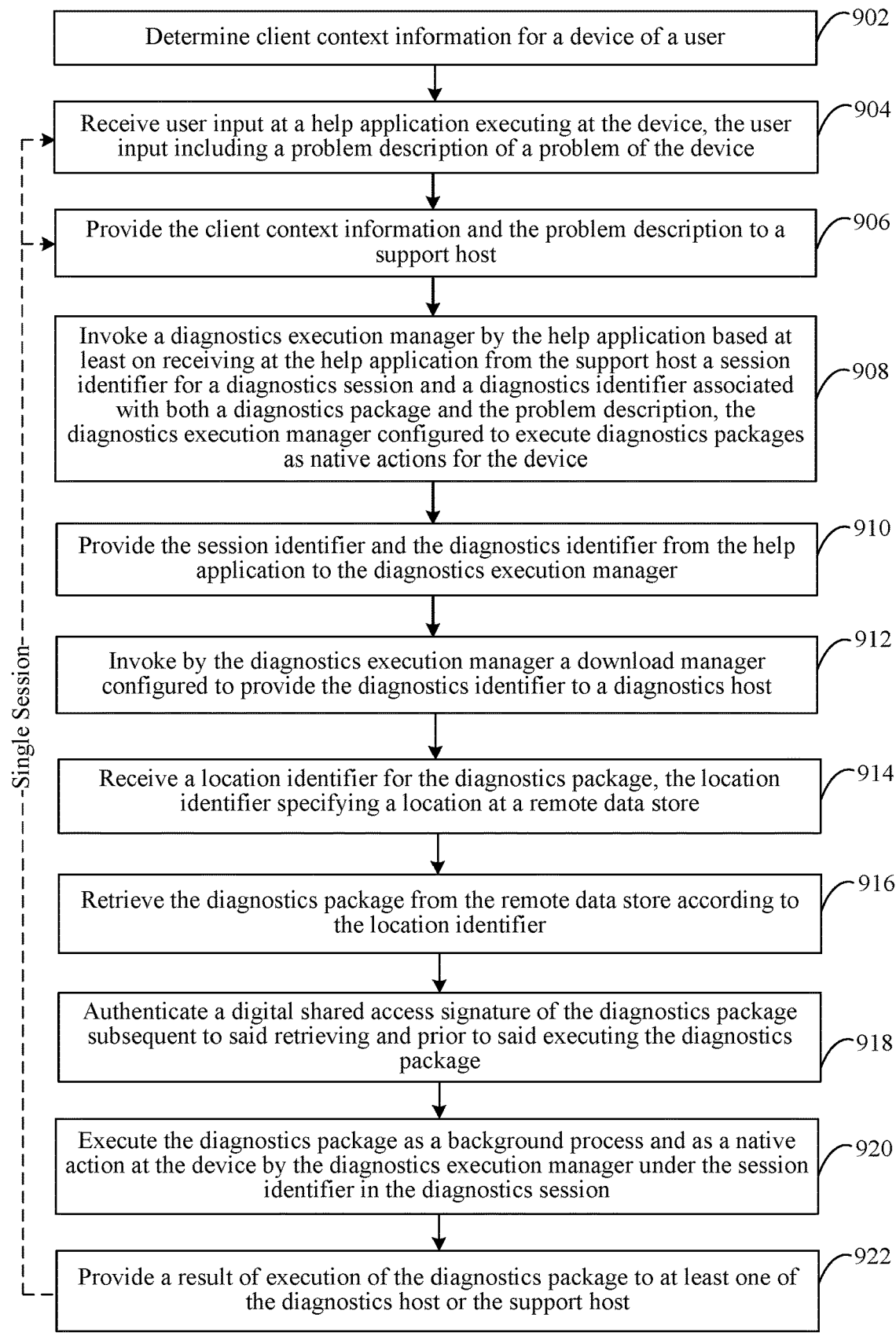

FIG. 9 shows a flowchart for configurable and proactive application diagnostics and recovery, in accordance with an example embodiment.

Figure 10:
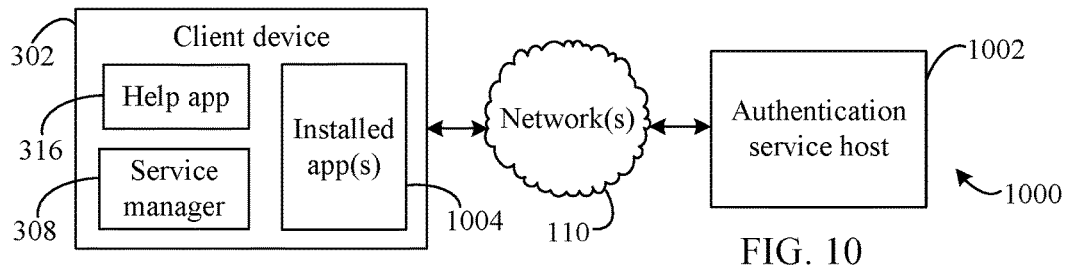

FIG. 10 shows a block diagram of a client system for configurable and proactive application diagnostics and recovery, in accordance with an example embodiment.

Figure 11:
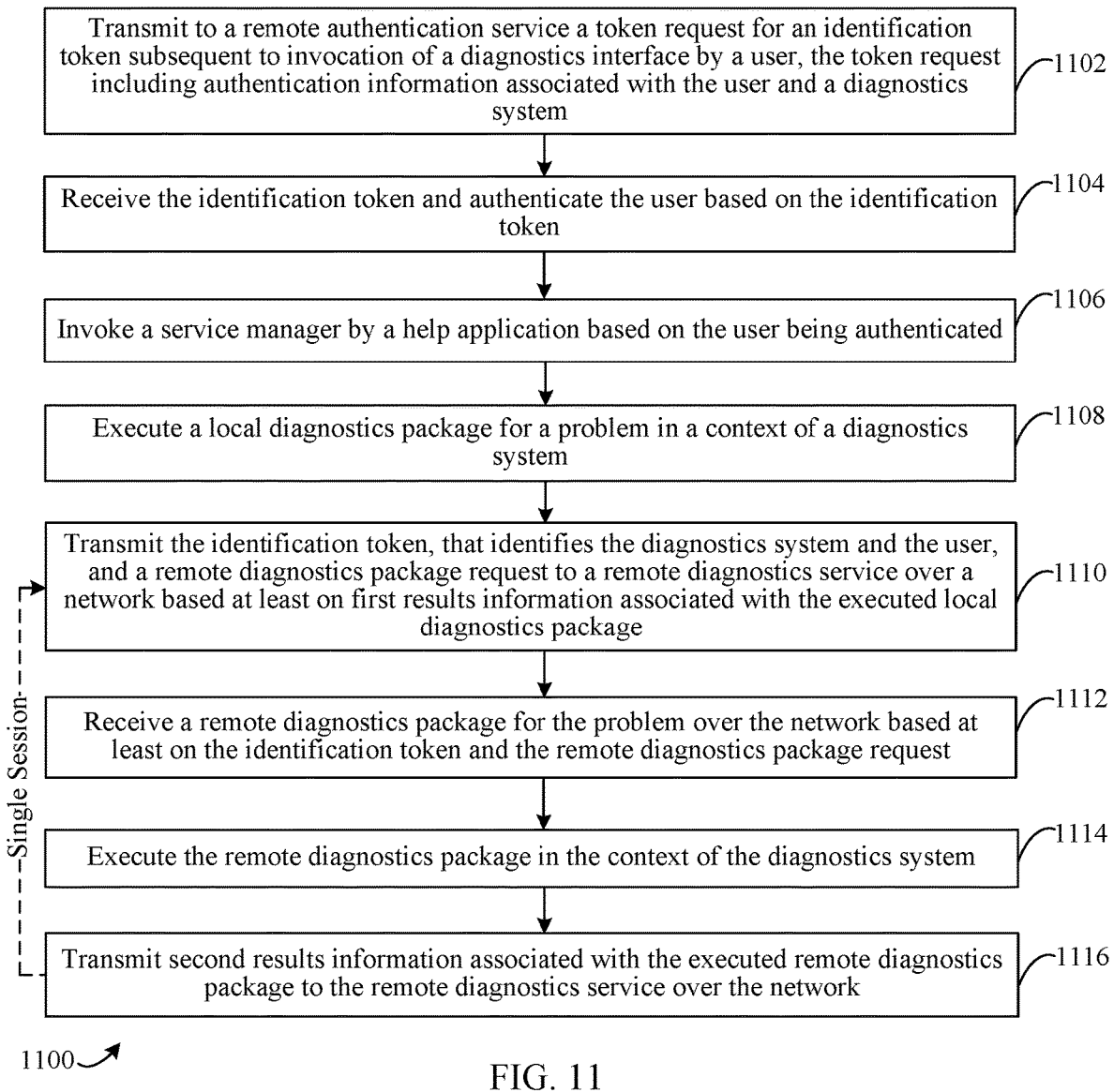

FIG. 11 shows a flowchart for configurable and proactive application diagnostics and recovery, in accordance with an example embodiment.

Figure 12:
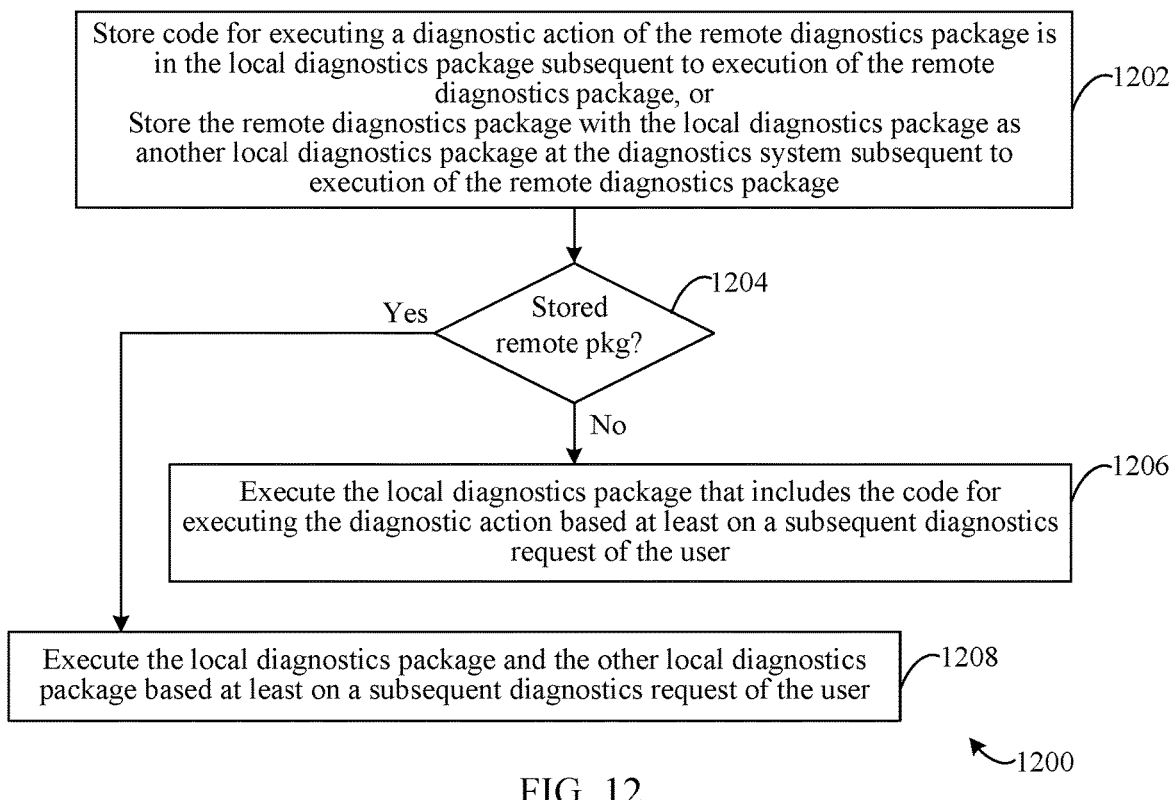

FIG. 12 shows a flowchart for configurable and proactive application diagnostics and recovery, in accordance with an example embodiment.

Figure 13:
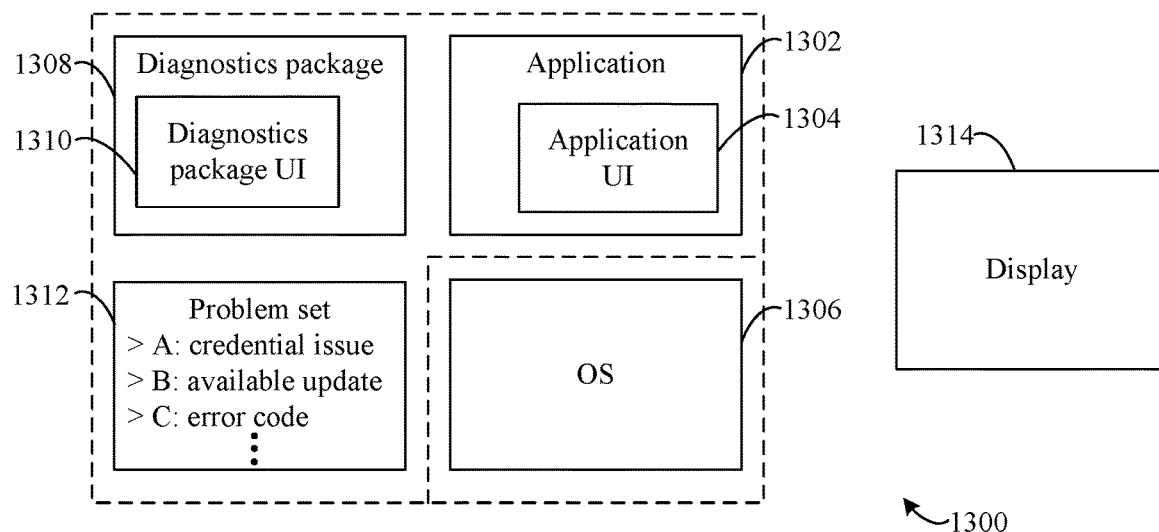

FIG. 13 shows a block diagram of a client system for configurable and proactive application diagnostics and recovery, in accordance with an example embodiment.

Figure 14:
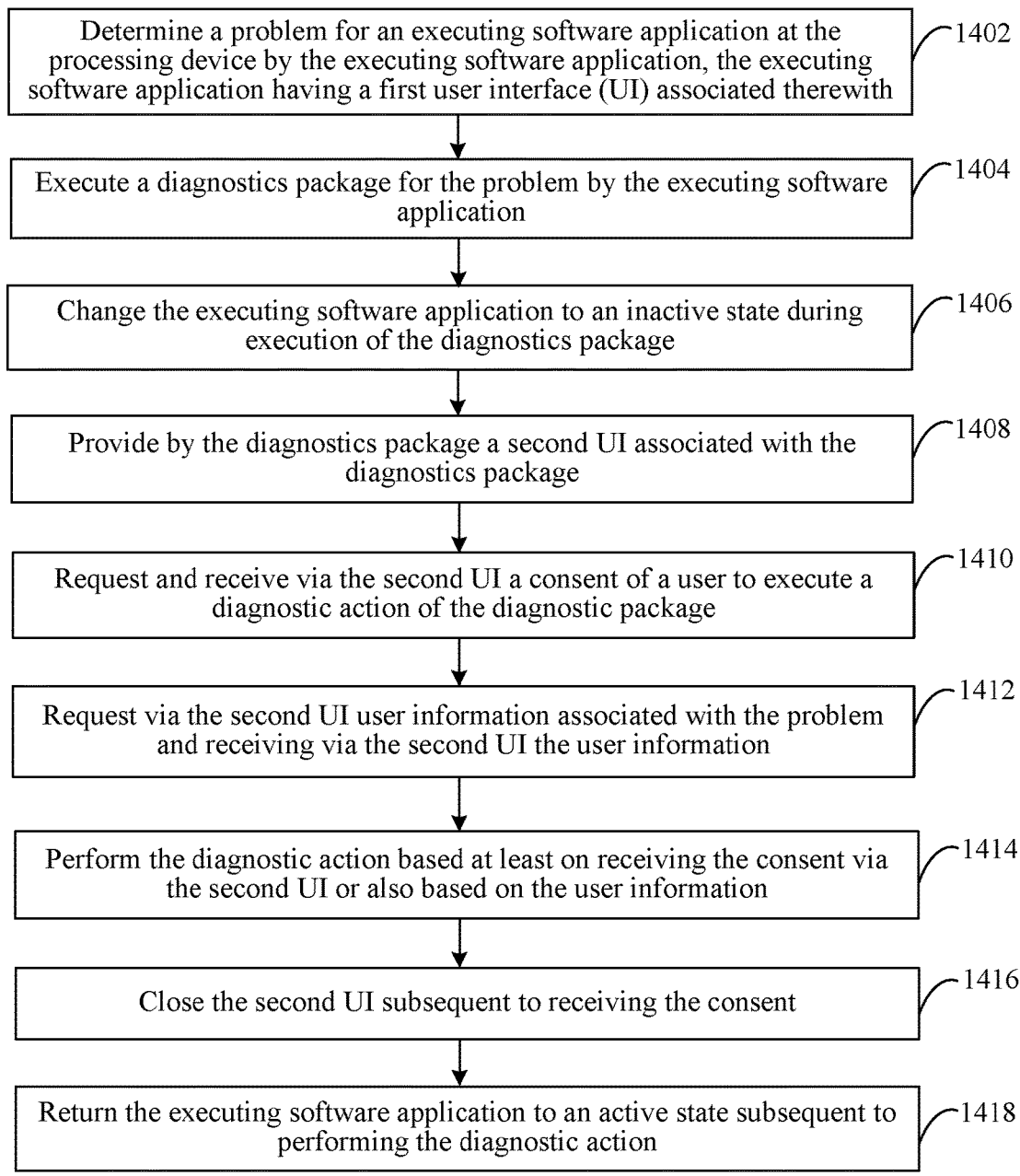

FIG. 14 shows a flowchart for configurable and proactive application diagnostics and recovery, in accordance with an example embodiment.

Figure 15:
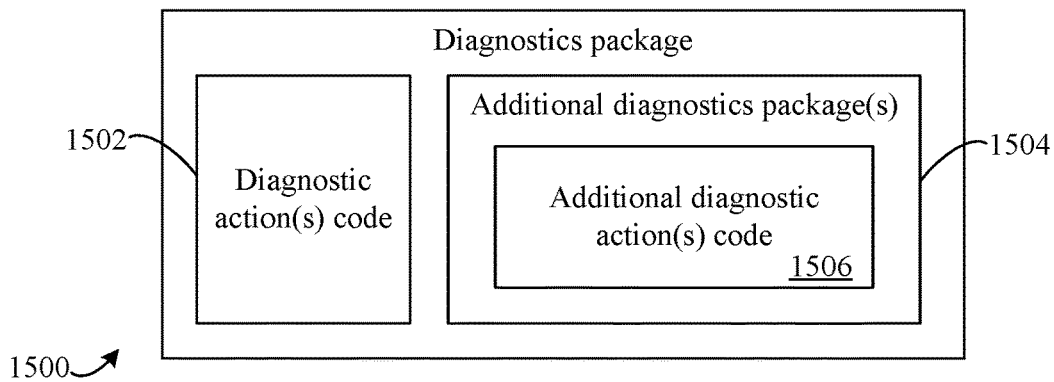

FIG. 15 shows a block diagram of a diagnostics package for configurable and proactive application diagnostics and recovery, in accordance with an example embodiment.

Figure 16:
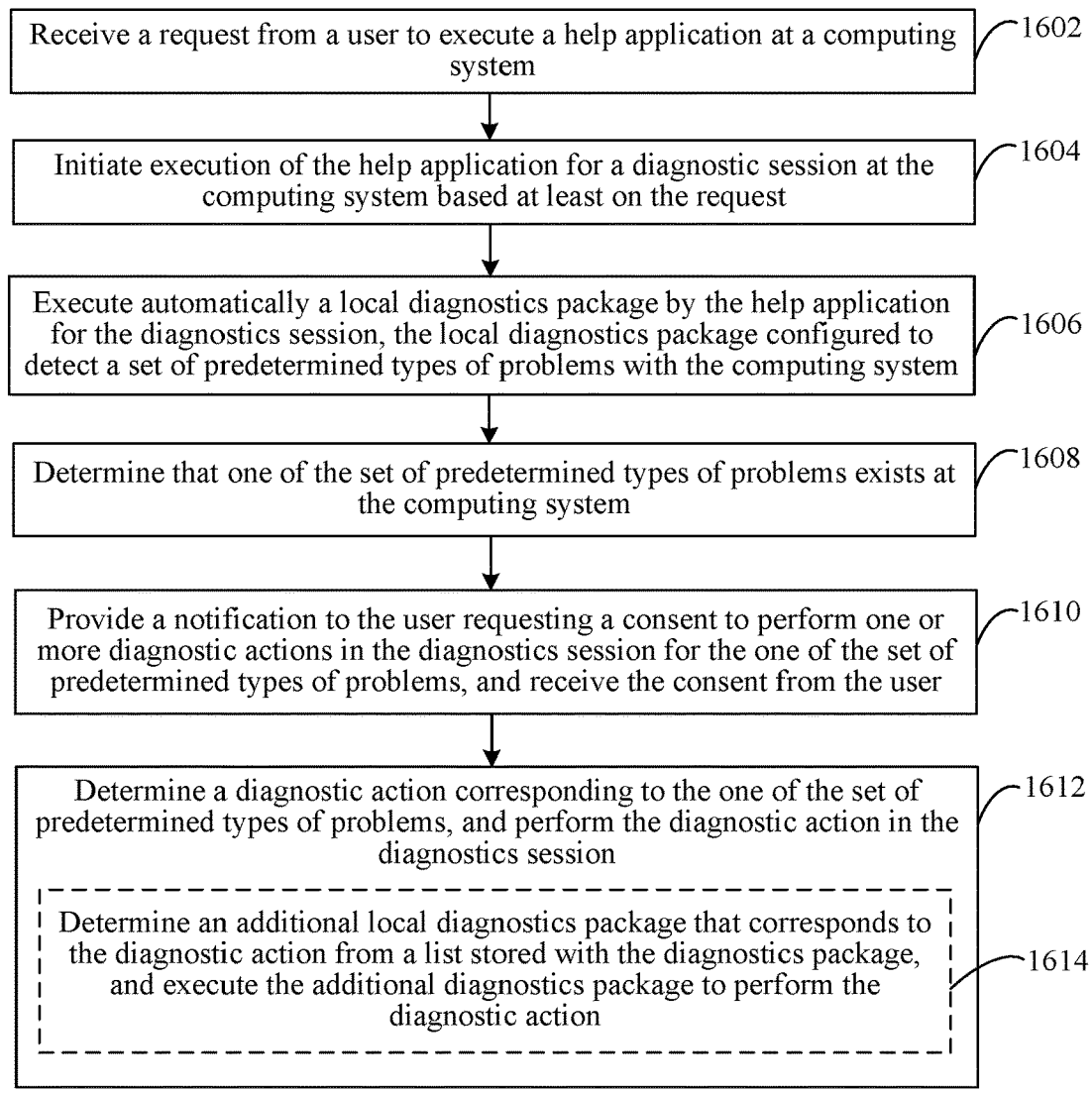

FIG. 16 shows a flowchart for configurable and proactive application diagnostics and recovery, in accordance with an example embodiment.

Figure 17:
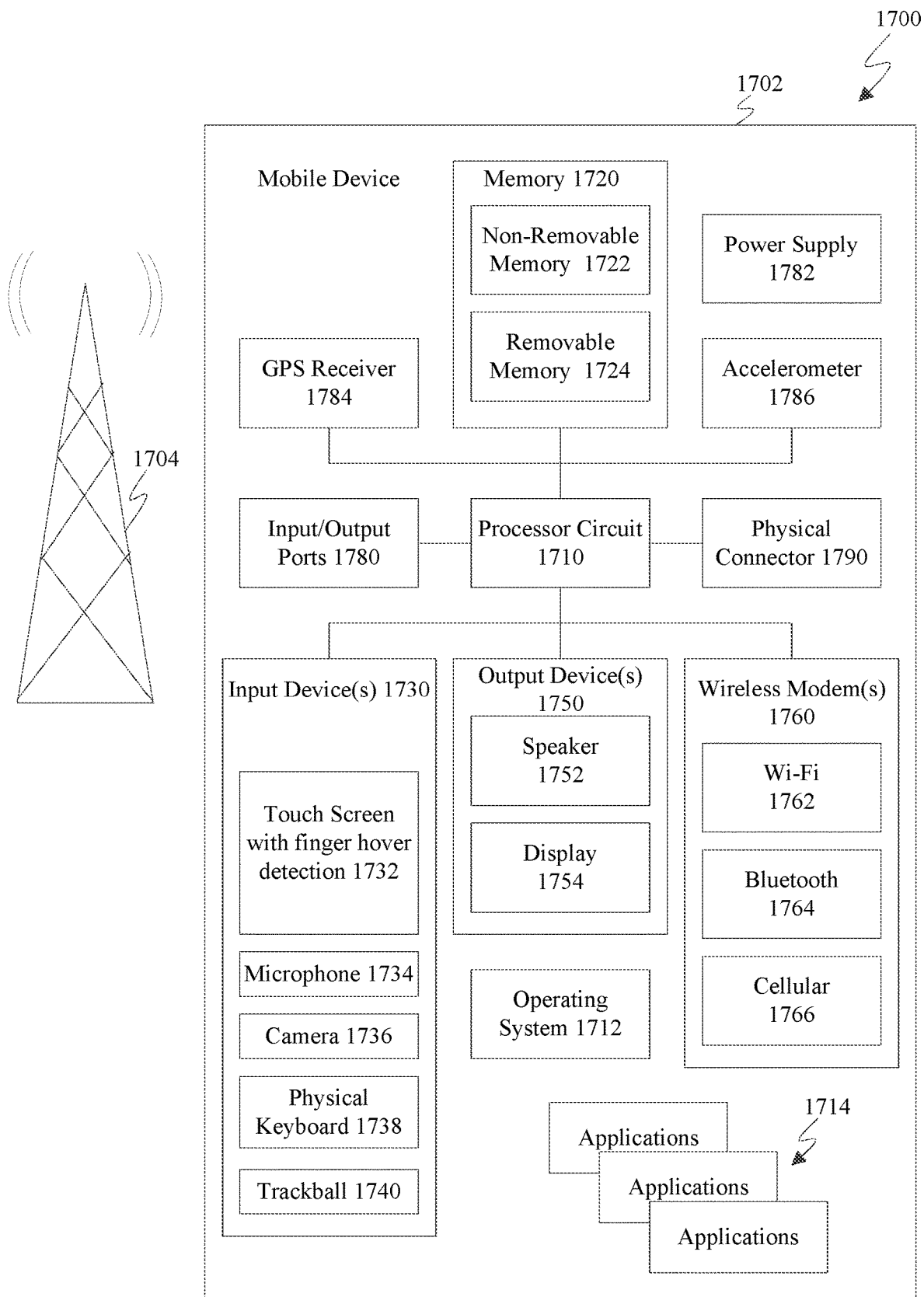

FIG. 17 shows a block diagram of an example mobile device that may be used to implement various example embodiments.

Figure 18:
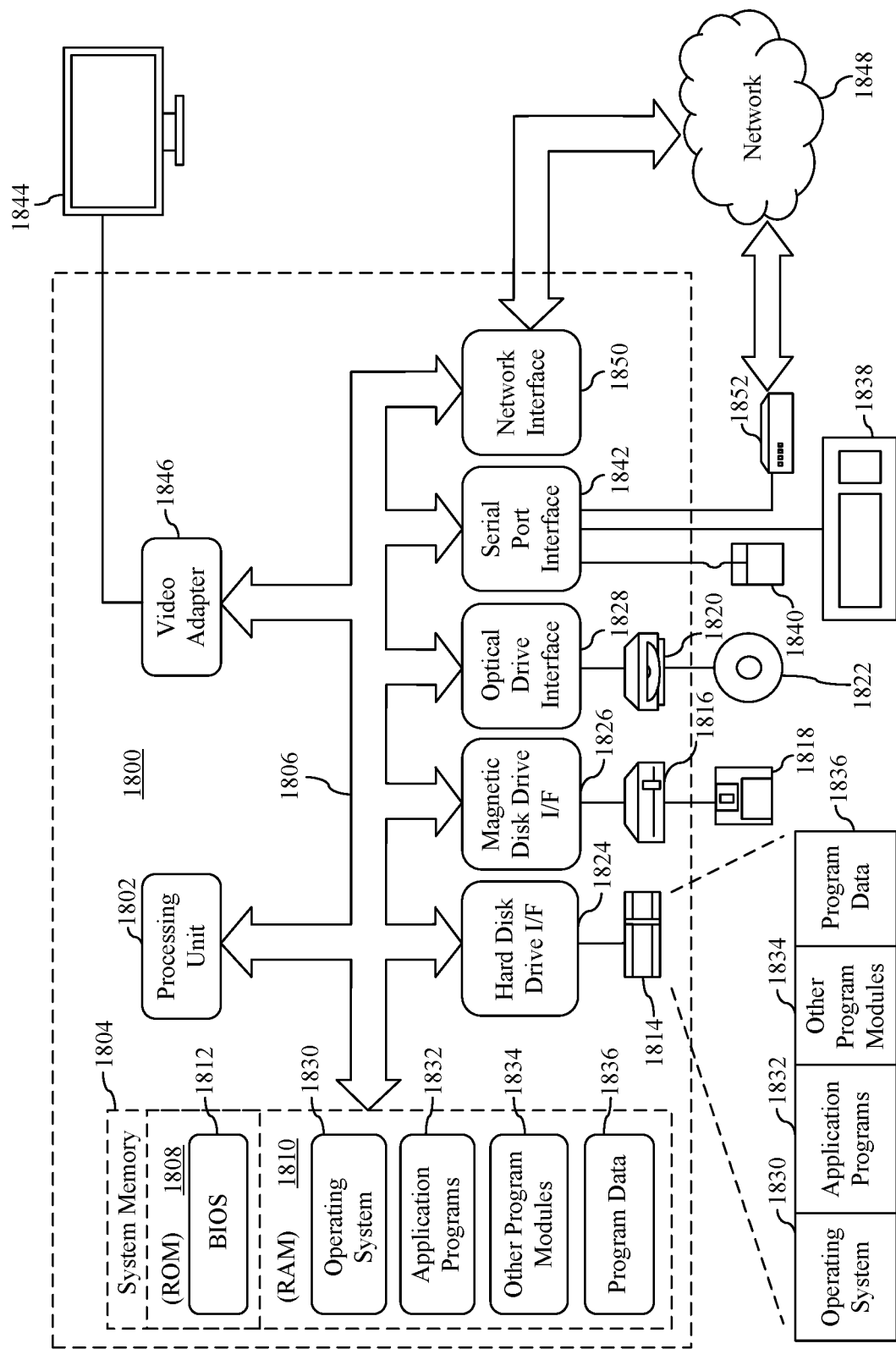

FIG. 18 shows a block diagram of an example computing device that may be used to implement embodiments.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used herein, the term "user" and "customer" may be used interchangeably unless expressly noted otherwise for specific embodiments.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for configurable and proactive application diagnostics and recovery. Specifically, Section II.A describes example embodiments of systems and devices for single-session methods for configurable and proactive application diagnostics and recovery, and Section II.B describes additional example embodiments of systems and devices for configurable and proactive application diagnostics and recovery. Section III below describes example mobile device and computing device embodiments that may be used to implement features of the embodiments described herein. Section IV below describes additional examples and advantages, and Section V provides some concluding remarks.

II. Example Embodiments for Configurable and Proactive Application Diagnostics and Recovery Methods, systems, apparatuses, devices, and computer program products are provided for configurable and proactive application diagnostics and recovery. Such embodiments enable flexible and dynamic diagnosis and remediation for problems experienced by a user at the user's device without requiring user interaction to determine the diagnostics packages used. That is, the embodiments herein allow for a user to describe a problem they are experiencing but the identification of appropriate diagnostics packages to be run against the problem is performed proactively and automatically. For instance, the user may interact with an automated support agent of a diagnostics host system to report the problem. The user's description of the problem may be analyzed through machine learning and natural language analysis to identify characteristics of the problem which then are used by the system to determine appropriate diagnostics packages to execute. Any number of diagnostics packages may be identified and executed during a single diagnostics session until the problem is diagnosed and actions are taken. The diagnostics packages are provided by the system to the client device, and the system invokes a diagnostics engine at the client device to execute the packages. Embodiments also provide for proactive diagnosis of problems with little or no explicit user input to describe the problems.

From a user device perspective, embodiments herein provide for the acquisition of device-specific and/or device-bound tokens that identify both the user as well as the user's device. These tokens allow for single diagnostics sessions in which local diagnostics packages may be run at the client device followed by diagnostics packages that are provided from a remote diagnosics system host based on results for the executed local diagnostics packages. Additionally, a local diagnostics package for detecting predetermined problems may be run at a client device subsequent to a user invoking a diagnostics application. When such problems are detected, the user is notified for consent to execute other diagnostics packages to fix the problems.

With the growth of modern software development technologies, the complexity of the software applications has grown significantly. Modern applications heavily rely on variety of technologies and dependencies such as operating system (OS) infantries, micro services, and many other elements of modern software applications. Such complexities make applications prone to errors and make debugging, diagnostics, and fixing of software issues a challenging task. Currently, many hours are spent by support engineers from software companies in investigating issues and locating fixes. Accounting for this complexity, new software systems require a different approach to managing application health when deployed to end users.

Similar to the complex human body, the health problems of applications vary from catastrophic shutdown (e.g., application crashes) to chronic illnesses (e.g., applications run slowly, some functionality is lost function, etc.). The symptoms of problems with applications can give identifiable signals for upcoming health problems or developing issues in such software applications. However, in many cases, application end users are left with few choices when application health is deteriorating. For example, end users can try to resolve problems by themselves (e.g., self-help) or they can reach out to support or technical personnel. Yet, both of these approaches direct users away from the application and the task they were trying to complete, thus creating distraction, user dissatisfactions with the application product, and increasing resource utilization of user devices such as consumption of power, processing cycles, and memory in the time spent resolving problems.

Self-help articles such as FAQs, while effective for common issues and well-defined problems, may not be applicable to all application problem situations due to the complexity of modern software. For instance, when diagnosing medium to large software systems, it is currently unavoidable to have support agents in place for solving such problems. At the same time, engaging with support agents is usually very time consuming due fact that the agents need to investigate the issue often during communication with the users. Due to the lack of context and time required, in many cases support agents treat and/or resolve only the symptoms of problems resulting in multiple support calls from the same customer. Such a situation is both costly for companies in direct support costs as well as indirectly through customer satisfaction degradation in the customer base.

Additionally, current generation virtual support agents such as bots begin problem diagnoses by asking the customer for a problem statement, and then applying different techniques in an attempt to identify the customer's intent before presenting a solution. However, this approach makes two key assumptions: (1) the customer knows what is wrong, i.e., can identify the problem, and (2) the customers can accurately describe what is wrong. These two assumptions are often incorrect, especially for technical support issues, and this leads to unhelpful solution recommendations, calls to human support agents, lower customer satisfaction, and additional resource consumption by the customer device. For example, current virtual agent solutions generally include giving the customer a list of things that might be wrong based on a customer description of the problem. The presented list may be affected by the type of customer, where the customer is engaging with support, etc., but all involve uneducated guessing. In fact, most lists show multiple options in order to increase the probability that the correct intent is presented, which in turn makes the identification of the correct solution more difficult for the customer.

Scalable and configurable systems for application diagnostic and recovery that allow for proactive identification and fixes for problems are described herein. The described embodiments provide solutions to the problems above and combine sets of prevention measures to analyze heath of applications (e.g., proactive resolution) and sets of electronic packages (e.g., diagnostics packages) to diagnose and solve problems. The embodiments provide for a diagnose-and-fix platform that allows for automatic handling of certain high-volume support issues/call drivers and provides solutions to better support the customer experience. A ledger or database of treatments/actions performed by such packages may be stored in the cloud and provides a configurable and scalable mechanism to learn about problems with applications, provide better treatments, and inform support agents if users end up contacting support directly.

Because users often do not know how best to describe their application problems, or how to find the best/correct solutions for them, problem identification and diagnosis is impeded. Further, if a user finds the correct solution to a problem, the solutions are often very technical in nature and difficult to deploy for the average user. The embodiments herein also provide for a more accurate mechanism to discover the customers' intent and context in different support and diagnostic scenarios that does not rely solely on the customer describing their problem to a virtual support agent. The proactive solutions in the embodiments herein utilize the context of the user and the user's device (i.e., client context information), including but without limitation, information about the user's history, profile, device, etc. Some non-exhaustive examples include a device name, make, and/or model, a user identifier (ID) and/or account profile, a purchase history, a usage history, application logs, error logs, and/or the like.

Accordingly, the user/client context and intent can be identified and used in diagnosing and fixing problems for software applications. The embodiments herein contemplate such identification through rules-based and/or machine learning techniques that utilize context and intent information to determine the correct packages to diagnose and fix problems.

In other words, the embodiments disclosed herein provide for configurable and proactive application diagnostics and recovery. These and further embodiments are described in greater detail as follows.

Figure 1:
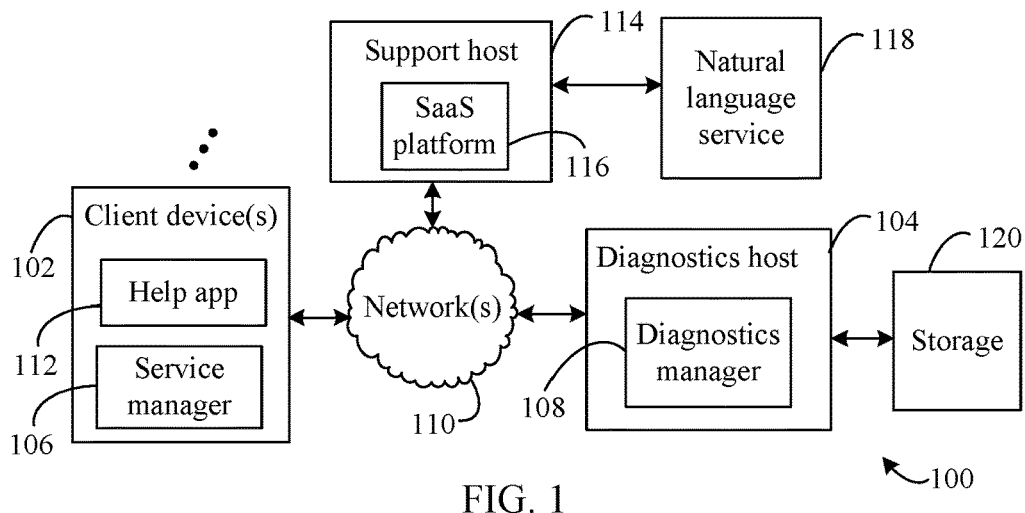
FIG. 1 shows a block diagram of a networked system for configurable and proactive application diagnostics and recovery, according to an example embodiment.

In embodiments, systems and devices may be configured in various ways for configurable and proactive application diagnostics and recovery. For instance, FIG. 1 is a block diagram of a diagnostics and recovery system 100 ("system 100" herein), according to embodiments. System 100 is configured to enable configurable and proactive application diagnostics and recovery, according to embodiments. As shown in FIG. 1, system 100 includes a client device(s) 102, a diagnostics host 104, a support host 114, and a natural language service host 118 which may communicate with each other over a network 110. It should be noted that any numbers of client devices, diagnostics hosts, support hosts, and/or natural language service hosts may be present in various embodiments. Additionally, any combination of the components illustrated in FIG. 1 may be present in system 100, according to embodiments.

As noted above, client device 102, diagnostics host 104, support host 114, and natural language service host 118 are communicatively coupled via network 110. Network 110 may comprise any type of communication links that connect computing devices and servers such as, but not limited to, the Internet, wired or wireless networks and portions thereof, point-to-point connections, local area networks, enterprise networks, and/or the like.

Client device(s) 102 may be any type of computing device or computing system, including without limitation, a terminal, a personal computer, a laptop computer, a tablet device, a smart phone, a game console, etc., that may be used by users to interact with a help application 112, diagnostics host 104, and support host 114, including to request diagnostics sessions for problems related to applications installed and/or executing on client device 102. Client device 102 may also include a service manager 106. Additionally, client device(s) 102 may include servers or enterprise platforms that require diagnostics sessions; in this scenario, such servers and platforms are treated as client devices with respect to diagnostics host 104 and support host 114.

As described herein, the performance of configurable and proactive application diagnostics and recovery may utilize help application 112 as an entry point or portal for the user/customer to request diagnostics and/or provide consent for proactive diagnostics. For instance, a user starts help application 112 which may load a virtual help agent in a user interface (UI), web control, etc. Details related to client device 102 (e.g., user device context information) may be provided to support host 114 from help application 112, and descriptions of problems faced by users, as well as diagnostics requests, may be provided to the virtual help agent. Such information may be passed over network 110 to diagnostics host 104 and/or support host 114.

As illustrated, client device 102 includes service manager 106 which may be implemented in hardware or hardware combined with one or both of software and/or firmware, and may be configured to perform functions/operations for configurable and proactive application diagnostics and recovery, as described in further detail below. Service manager 106 may be configured to retrieve diagnostics packages for client device 102 and help application 112, and store the diagnostics packages at a specified location at client device 102, based at least on the initiation instruction for performing diagnostics from client device 102. The initiation instruction specifies the session identifier and the diagnostics identifier. Service manager 106 may also be configured to invoke a diagnostics engine at client device 102 to execute diagnostics packages for diagnostic actions. Additional details regarding service manager 106 are provided below.

Client device 102 may also include one or more application programming interfaces (APIs) associated with service manager 106. These APIs may be exposed to allow API calls (e.g., requests, queries) to service manager 106 from help application 112, as described herein. APIs may be specific to service manager 106 in embodiments. Additionally, APIs as described herein may be implemented as RESTful APIs.

In embodiments, a user of client device 102 and client device 102 may communicate with diagnostics host 104 and/or support host 114 via help application 112, and also with an authentication service (not shown) that may be associated with diagnostics host 104 and/or support host 114. A request from client device 102 for a diagnostics session, as well as information related to the user and/or client device 102, may be transmitted to diagnostics host 104 and/or support host 114 via help application 112.

Support host 114 may comprise one or more server computers or computing devices, which may include one or more distributed or "cloud-based" servers. Support host 114 may be configured to host a software as a service (SaaS) platform 116. SaaS platform 116 may be, without limitation, a support action framework, or the like. Accordingly, support host 114 is configured to receive queries or diagnostic requests from a user at client device 102 for diagnosing and fixing application problems, and to create support sessions (or diagnostic sessions) via SaaS platform 116 in embodiments. SaaS platform 116 may be configured to communicate information such as query/request information related to natural language inputs, client context information, etc., to natural language service host 118 for processing as described below. SaaS platform 116 may also be configured to communicate an indication of a new session being started and information such as session identifiers, client information, client context, problem identifiers, types, and information, and/or the like to diagnostics host 104.

In embodiments, SaaS platform 116 and/or support host 114 may be configured to acquire authentication tokens, as described herein, for access to diagnostics host 104 for diagnosing applications of SaaS platform 116 and/or support host 114. In some embodiments, SaaS platform 116 and/or support host 114 may be conceptually, logically, and/or physically grouped together with diagnostics host 104 as a diagnostics system.

SaaS platform 116 and/or support host 114 may be implemented as part of a service fabric. The service fabric may include a distributed systems platform that enables packaging, deployment, and management for scalable and reliable services. The service fabric may enable comprehensive application management capabilities to provision, deploy, monitor, upgrade/patch, and delete deployed applications. Additionally, health checks for SaaS platform 116 and/or support host 114 may be performed utilizing the service fabric. For example, on service startup, external connectivity may be verified, e.g., connections to the document databases and diagnostics package storage, startup dependencies/conflicts checks, etc., so that failures may be reported and remediated. Moreover, failures may trigger the process of rollback to previous versions on affected nodes. Recurring checks may also be performed periodically, including but without limitation, verifying the ability to write test records into the databases and storage, verifying expiration times for accesses, etc.

Natural language service host 118 may comprise one or more server computers or computing devices, which may include one or more distributed or "cloud-based" servers. Natural language service host 118 is configured to interpret natural language information from the user query/request and to match this information to a diagnostic action decision tree. Accordingly, a proper action may be determined to diagnose and/or remedy a problem. Natural language service host 118 may also be configured to instruct support host 114 to initiate a diagnostics session to take action for the matched problem.

Diagnostics host 104 may comprise one or more server computers or computing devices, which may include one or more distributed or "cloud-based" servers. Diagnostics host 104 may also include internal and/or external storage, such as but not limited to, a storage 120. In embodiments, external storage may also be associated with natural language service host 118 and/or support host 114. Any internal and/or external storage may be distributed, according to embodiments. Diagnostics host 104 is configured to host diagnostics management and service components used in performance of the described embodiments herein. For example, diagnostics host 104 is configured to receive information from SaaS platform 116 of support host 114 as described above. The indication from SaaS platform 116 may be an indication for a new diagnostics session to begin. The new session indication causes diagnostics host 104 to match the problem type to a known action and diagnostics package, and to return a session ID to identify the diagnostics session and a diagnostics ID to identify at least one of the diagnostic action or the diagnostics package back to SaaS platform 116. SaaS platform 116 is then configured to set a support host context with the returned session ID and diagnostics ID. This support host context is then provided to the virtual help agent which, upon receiving the diagnostic action event, invokes the client-side diagnostics process engine through help application 112 to execute a native action (e.g., to run the diagnostic action of the diagnostics package in the client device context).

As illustrated, diagnostics host 104 includes a diagnostics manager 108 which may be implemented in hardware or hardware combined with one or both of software and/or firmware, and may be configured to perform functions/operations for configurable and proactive application diagnostics and recovery, as described in further detail below. Diagnostics manager 108 may be configured to receive the client context information, the problem type information, and the session initiation indication for a diagnostics session, and to filter a diagnostics database based at least on the information. This filtering is used to determine a diagnostics package for the diagnostic action to apply against the problem in the client context, and to generate a session identifier and select/retrieve a diagnostics identifier for the diagnostics package/action. The session identifier and the diagnostics identifier are then transmitted to client device 102 from diagnostics manager 108 responsive to a client device request.

It should be noted that as described herein, embodiments are applicable to any type of device or system that communicates context and problem information over a network for configurable and proactive application diagnostics and recovery. One example is where the diagnostics host 104 and/or support host 114 are "cloud" services in a network architecture/platform. A cloud platform includes a networked set of computing resources, including servers, routers, etc., that are configurable, shareable, provide data security, and are accessible over a network such as the Internet. Cloud applications run on the computing resources, often atop operating systems that run on the computing resources, for servicing devices of tenants. A cloud platform may support multi-tenancy, where cloud platform-based software, e.g., for application diagnostics and recovery, services multiple tenants, with each tenant including one or more users that require application diagnostics and recovery services of the cloud platform for their devices. Furthermore, a cloud platform may support hypervisors implemented as hardware, software, and/or firmware that run virtual machines (emulated computer systems, including operating systems) for tenants. A hypervisor presents a virtual operating platform for tenants.

A. Example Embodiments of Systems and Devices for Single-Session Methods for Configurable and Proactive Application Diagnostics and Recovery Systems and devices such as diagnostics systems and devices, e.g., system 100, client device 102, diagnostics host 104, and/or support host 114 described above with respect to FIG. 1, may be configured in various ways for improvements and enhancements in configurable and proactive application diagnostics and recovery. Host-side diagnostics examples are described in this subsection.

1. Host-Side Diagnostics Examples

Figure 2:
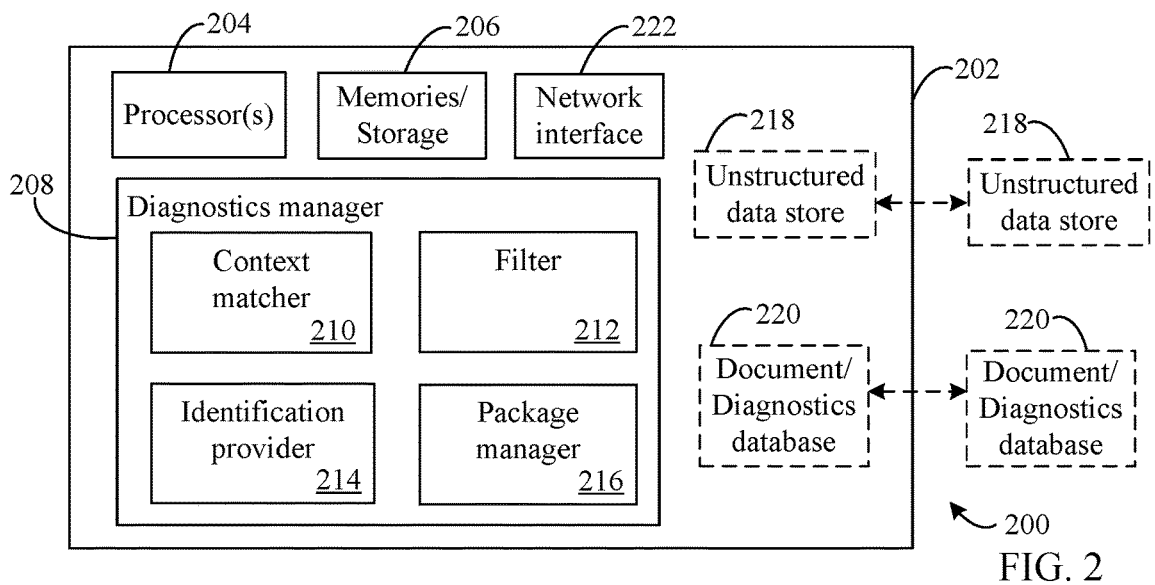
FIG. 2 shows a block diagram of a host system for configurable and proactive application diagnostics and recovery, according to an example embodiment.

For example, FIG. 2 is a block diagram of a diagnostics host system 200 ("system 200" herein) configured for configurable and proactive application diagnostics and recovery. System 200 is an embodiment of system 100 in FIG. 1. System 200 is described as follows.

System 200 includes a diagnostics host 202, which may be an embodiment of diagnostics host 104 of FIG. 1, and may be any type of server computer or computing device, as mentioned elsewhere herein, or as otherwise known, including cloud-based server implementations. As shown in FIG. 2, system 200 and diagnostics host 202 include one or more of a processor ("processor") 204, one or more of a memory and/or other physical storage device ("memory") 206, one or more network interfaces ("network interface") 222. System 200 and diagnostics host 202 also include a diagnostics manager 208 that may be an embodiment of diagnostics manager 108 of FIG. 1. System 200 and diagnostics host 202 may also include an unstructured data store 218, and a document/diagnostics database ("DB") 220. System 200 and diagnostics host 202 may also include additional components (not shown for brevity and illustrative clarity) including, but not limited to, components and subcomponents of other systems herein, as well as those described below with respect to FIGS. 17-18, such as an operating system (OS).

Processor 204 and memory 206 may respectively be any type of processor circuit/processing system or memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 comprises circuitry that is configured to execute computer program instructions such as but not limited to embodiments of diagnostics manager 208, which may be implemented as computer program instructions for configurable and proactive application diagnostics and recovery, etc., as described herein. Memory 206 is configured to store such computer program instructions/code, as well as to store other information and data described in this disclosure including, without limitation, session information and identifiers (IDs), diagnostic packages including diagnostic actions, diagnostic package information (e.g., a ledger or list of treatments/actions performed by diagnostic packages), diagnostic action information, diagnostics results, and/or the like. In some embodiments, storage 120 of FIG. 1 may also be included in system 200, e.g., as a portion of memory 206 and/or external to diagnostics host 202.

Network interface 222 may be any type of wired and/or wireless network adapter, modem, etc., configured to enable system 200 to communicate with other devices over a network, such as communications between system 200 and other devices utilized in embodiments, such as described above with respect to FIG. 1, and described below with respect to FIG. 3, over a network such as network 110.

Unstructured data store 218 may be any size and/or type of storage configuration, including but not limited to, hard drives or other physical storage media, distributed storage, data clusters, data centers, storage arrays, cloud-based storage, and/or the like. Unstructured data store 218 may be local or remote to diagnostics host 202. Unstructured data store 218 may include, without limitation, stored diagnostics packages as described herein. Diagnostics packages may be associated with location identifiers such as uniform resource locators (URLs) or the like. For example, in an embodiment unstructured data store 218 may be, or may be similarly configured to, Azure® Blob Storage from Microsoft Corporation of Redmond, Wash., and be configured to provide scalable, durable, and highly available storage for diagnostics packages and data/information related thereto.

In embodiments, unstructured data store 218 may be configured to utilize Shared Access Signatures (SAS) to grant time/privilege limited access to objects therein, such as diagnostics packages. Accordingly, unstructured data store 218 may be accessible to many users without having to expose account keys. SAS also enables delegated access to resources/objects in unstructured data store 218 through granular control over the type of access provided to different users. The SAS policy of unstructured data store 218 may be configured to control the interval over which SAS and/or permissions such as read/write/list are valid, to provide optional IP addresses which may accept SAS requests, and/or the like. In some embodiments, unstructured data store 218 may employ GRS (Geo Redundancy Storage) to enable immediate availability for data, information, and objects in unstructured data store 218 across two or more regions for diagnostics services. Thus, loss of data may be prevented, and availability thereof may be maintained, for access impediments of any one region. For instance, GRS may replicate data to a secondary region that is geographically remote to the primary region. In an example, unstructured data store 218, with GRS enabled, is configured to maintain durability of data in the case of a complete regional outage or a disaster in which the primary region is not recoverable. Data updates may first be committed to the primary region, and replicated one or more times. Then the update may be replicated asynchronously to the secondary region, where it is also replicated one or more times. Accordingly, both the primary and secondary regions manage replicas of data across separate fault domains.

DB 220 may be any type of storage configuration, including but not limited to, hard drives or other physical storage media, distributed storage, data clusters, data centers, storage arrays, cloud-based storage, and/or the like. DB 220 may be local or remote to diagnostics host 202. DB 220 may include, without limitation, one or more DBs to store data/information related diagnostics packages and/or diagnostic actions, including metadata therefor. DB 220 may be configured to enable data persistence through a globally distributed, multi-model database platform. DB 220 may be configured to support different data models, such as but not limited to: key-value pairs, documents, graphs, and columnar data, and is also configured to support API calls for accessing data therein. DB 220 may include collections for storing session data and action/package metadata. DB 220 may be configured to enable data replication across geographic regions. In embodiments, DB 220 may be, or may be similarly configured as, Azure® DocumentDB or Azure® Cosmos DB from Microsoft Corporation of Redmond, Wash.

Diagnostics manager 208 includes a plurality of components for performing the techniques described herein for configurable and proactive application diagnostics and recovery. As shown, diagnostics manager 208 includes a context matcher 210, a filter 212, an identification provider 214, and a package manager 216. While shown separately for illustrative clarity, in embodiments, context matcher 210, filter 212, identification provider 214, and/or package manager 216 may be combined together and/or as a part of other components of system 200.

Context matcher 210 is configured to match the context of a problem experienced by a user with corresponding diagnostics packages/actions. Context matcher 210 may be configured to receive information related to a request for a diagnostics session and to determine an appropriate diagnostics package(s) and/or action(s) for a problem a client is experiencing. Information may include, without limitation, client context information, a problem type, etc. Context matcher 210 may be configured to use filter 212 to filter a diagnostics database based on one or more of problem types, client context information, diagnostics package/action metadata, and/or the like, to determine a diagnostics package having the appropriate action for the problem.

Context matcher 210 and diagnostics host 202 may receive a session initiation indication for a diagnostics session from a support host, e.g., from SaaS platform 116 of support host 114 described with respect to FIG. 1. Additionally, client context information, problem type, and/or other information may also be provided from the support host to context matcher 210, according to embodiments.

Identification provider 214 may be configured to generate session identifiers for diagnostics sessions and/or select/retrieve diagnostics identifiers that identify diagnostics packages or actions (or both) to provide to a client device, e.g., via support host 114 and SaaS platform 116. In embodiments, session identifiers may be unique identifiers associated with a client and/or a client device, and more than one diagnostic action may be taken under a single session identifier.

Package manager 216 may be configured determine or obtain a location identifier for a stored diagnostics package based on receiving a session identifier and a diagnostics identifier associated with a diagnostics initiation instruction. For example, when a request from a client device for a specific diagnostics package is received, package locator is configured to determine or obtain the associated location identifier, e.g., a URL of the diagnostics package, and provide the location identifier to a service manager, as described below.

While this subsection includes description and embodiments related to host-side operations, diagnostics hosts are configured to interact with client devices in performance of their functions. Accordingly, an embodiment of a client device is described next for reference to the diagnostics host embodiments.

Figure 3:
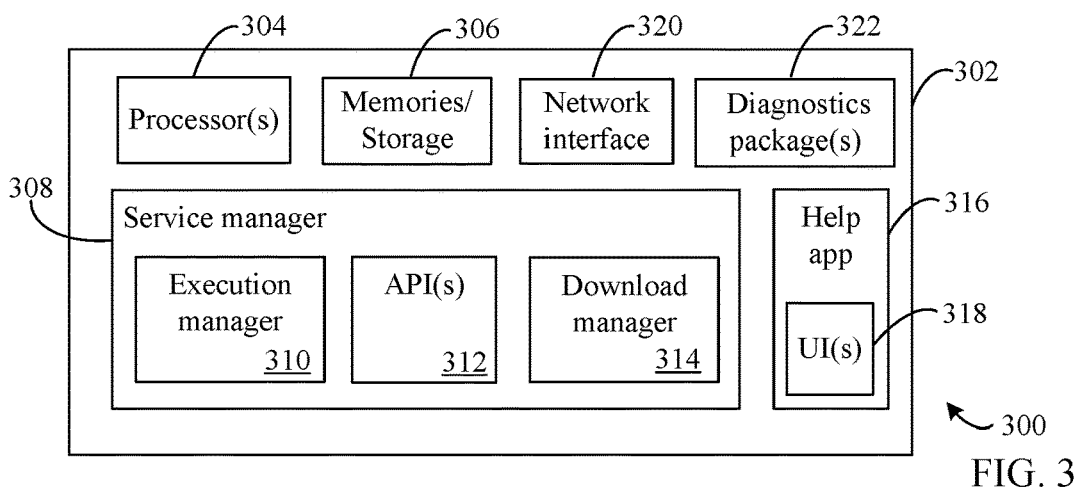
FIG. 3 shows a block diagram of a client system for configurable and proactive application diagnostics and recovery, in accordance with an example embodiment.

Turning now to FIG. 3, a block diagram of a client system 300 ("system 300" herein) configured for configurable and proactive application diagnostics and recovery is shown. System 300 is an embodiment of system 100 in FIG. 1. System 300 is described as follows.

System 300 includes a client device 302, which may be an embodiment of client device 102 of FIG. 1, and may be any type of processing device, as mentioned elsewhere herein, or as otherwise known, including server implementations. As shown in FIG. 3, system 300 and client device 302 include one or more of a processor ("processor") 304, one or more of a memory and/or other physical storage device ("memory") 306, one or more network interfaces ("network interface") 322. System 300 and client device 302 may also include a service manager 308 that may be an embodiment of service manager 106 of FIG. 1, and a help application 316 may be an embodiment of help application 112 of FIG. 1. System 300 and client device 302 may also include a diagnostics package(s) 322. System 300 and client device 302 may also include additional components (not shown for brevity and illustrative clarity) including, but not limited to, components and subcomponents of other systems herein, as well as those described below with respect to FIGS. 17-18, such as an operating system.

Processor 304 and memory 306 may respectively be any type of processor circuit/processing system or memory that is described herein, and/or as would be understood by a person of skill in the relevant art(s) having the benefit of this disclosure. Processor 304 and memory 306 may each respectively comprise one or more processors or memories, different types of processors or memories, remote processors or memories, and/or distributed processors or memories. Processor 304 comprises circuitry that is configured to execute computer program instructions such as but not limited to embodiments of service manager 308, which may be implemented as computer program instructions for configurable and proactive application diagnostics and recovery, etc., as described herein. Memory 306 is configured to store such computer program instructions/code, as well as to store other information and data described in this disclosure including, without limitation, session information and IDs, diagnostic packages including diagnostic actions, diagnostic package information, diagnostic action information, diagnostics results, and/or the like.

Network interface 320 may be any type of wired and/or wireless network adapter, modem, etc., configured to enable system 300 to communicate with other devices over a network, such as communications between system 300 and other devices utilized in embodiments, such as described above with respect to FIG. 1 and FIG. 2 over a network such as network 110.

Diagnostics package(s) 322 may include local diagnostics packages persistently stored by client device 302, e.g., in memory 206. Diagnostics package(s) 322 may also include remote diagnostics packages received from a remote data store such as unstructured data store 218. Such remote diagnostics packages may be persistently stored at client device 302 subsequent to being retrieved, or may be removed from client device 302 subsequent to execution thereof and/or after a predetermined time period has elapsed. Diagnostics package(s) 322 may include code for executing diagnostic actions associated therewith, as well as other information related to the diagnostics packages such as metadata, other information related to the diagnostics packages and diagnostic actions, and/or the like, as described herein.

As described herein, the performance of configurable and proactive application diagnostics and recovery may utilize a help application, e.g., help application 316, as an entry point or portal for the user/customer to request diagnostics and/or provide consent for proactive diagnostics. Help application 316 may load a virtual help agent in a user interface (UI) of UIs 318, a web control, etc. During handshaking operations associated with the loading of help application 316, details related to client device 302 (e.g., user device context information) may be provided to support host 114 of FIG. 1 from help application 316. Once loading completes, the diagnostics request process begins with the user describing the problem they are facing to the virtual help agent of help application 316. That is, client device 302 is configured to receive inputs from users, such as natural language inputs regarding application problems via a UI of UIs 318, and to provide user requests for diagnostics sessions as well as information therefor over a network to diagnostics host 104 (or diagnostics host 202) and/or support host 114 to enable diagnoses and actions for problem fixes, as described herein. In embodiments, client device 302 may receive and store one or more UIs from diagnostics hosts and/or support hosts described herein. Additionally, a UI of UIs 318 may be any type of service/application UI, browser, client or electronic communication application, messaging application, portal, and/or the like, and may be associated with, or in some examples a component of, help application 316.

Service manager 308 includes a plurality of components for performing the techniques described herein for configurable and proactive application diagnostics and recovery. As shown, service manager 308 includes an execution manager 310, APIs 312, and a download manager 314. While shown separately for illustrative clarity, in embodiments, execution manager 310, APIs 312, and/or download manager 314 may be combined together and/or as a part of other components of system 300. In some embodiments, less than all of the components of service manager 308 illustrated in FIG. 3 may be included. In software implementations, one or more components of service manager 308 may be stored in memory 306 and may be executed by processor 304.

Execution manager 310 and download manager 314 of service manager 308 may be configured to handle client-side communications with diagnostics host 202 of FIG. 2 and support host 114 of FIG. 1, as well as the performance of diagnostic actions. As noted above, e.g., with respect to FIG. 1, a user/customer at client device 102 may experience a problem with an application and invoke help application 112. With respect to FIG. 3, a user/customer of client device 302 may invoke help application 316 to resolve a problem via diagnostics. The invocation of help application 316 may, in addition to functions described above, cause a call to an API of APIs 312 to invoke execution manager 310 of service manager 308. In embodiments, such an API call may be a diagnostics initiation instruction. Help application 316 may provide a session identifier and a diagnostics identifier to execution manager 310 in association with the API call. For example, diagnostics manager 208 of diagnostics host 202 in FIG. 2 may be configured to provide such identifiers from identification provider 214 to a client device such as client device 102, via support host 114 and SaaS platform 116. Subsequent to receiving the session identifier and the diagnostics identifier, client 102 may provide them to execution manager 310 via help application 316.

Accordingly, execution manager 310 is configured to be invoked by help application 316 to perform diagnostic actions. Execution manager 310 is also configured to invoke download manager 314. Download manager 314 is configured to make a call to diagnostics manager 208 and package manager 216 of FIG. 2 for the location identifier of the desired diagnostics package associated with a problem according to the session identifier and the diagnostics identifier. Download manager 314 is configured to initiate the download of the diagnostics package from the identified location after the location identifier is received from package manager 216. The diagnostics package may be stored at a known or predefined location at the client device, e.g., with diagnostics package(s) 322, by download manager 314. Subsequently, execution manager 310 may be configured to invoke a diagnostics engine at the client device to run the diagnostics package. In embodiments, the diagnostics engine may be a scripted engine. The diagnostics engine may be a component of execution manager 310, of help application 316, and/or of the operating (OS) system of client device 102, according to embodiments. The diagnostics engine may be configured to run diagnostic packages as native OS processes, e.g., via a shell of the OS. The executed diagnostics package may be run silently, i.e., in the background and/or without additional inputs from, or information provided to, the user/customer for and during execution by the diagnostics engine.

Results information obtained from the execution of the diagnostics package may be provided by the diagnostics engine to the help application and/or a support host such as help application 316 and support host 114 of FIG. 1, as well as to diagnostics manager 208 of FIG. 2. In embodiments, results may comprise key-value pairs that include information related to remaining problems at the client device, problem resolution information, new problems, and/or the like. Such results may also be provided to natural language service 118 from support host 114 to determine further diagnostic actions to perform in the same session. In some embodiments, it may be determined that additional input from the user/customer is required or that the user/customer should be directed to other assisted support.

Thus, diagnostics manager 208 and service manager 308 may be configured to operate in various ways to enable configurable and proactive application diagnostics and recovery. For instance, the operations of system 100 of FIG. 1, system 200 of FIG. 2, and system 300 of FIG. 3, along with their respective components and subcomponents, may be conceptualized as steps in methods, flowcharts, and/or flow diagrams for configurable and proactive application diagnostics and recovery, according to embodiments. That is, a computer-implemented method(s), or methods of executed program code/instructions, may be performed by components of diagnostics host 104, support host 114, diagnostics host 202, and/or client device 302 according to embodiments.

Additional details and embodiments regarding diagnostics manager 208 and service manager 308, as well as system 100, system 200, and system 300 are provided below.

FIG. 4A shows a flowchart 400A and FIG. 4B shows a related flowchart 400B each of which are for configurable and proactive application diagnostics and recovery, in accordance with an example embodiment. Support host 114 in FIG. 1, diagnostics manager 208 of diagnostics host 202 in system 200, and/or service manager 308 of client device 302 in FIG. 3 may operate according to flowchart 400A and/or flowchart 400B. Further structural and operational examples will be apparent to persons skilled in the relevant art(s) based on the following description. Flowchart 400A and flowchart 400B are described as follows with respect to system 100 of FIG. 1, system 200 of FIG. 2, and system 300 of FIG. 3.

Flowchart 400A begins at step 402. In step 402, client context information provided by a help application of a client device is received, and a type of a problem and a session initiation indication for a diagnostics session provided by a support host are received. For example, client device 302 as noted above is configured to gather/generate and provide client context information to support host 114. Support host 114 is configured to provide a type of a problem and a session initiation indication for a diagnostics session to diagnostics manager 208. The type of the problem may be determined through the use of a natural language service such as natural language service 118 of system 100 in FIG. 1. Additionally, the client context information may be provided to diagnostics manager 208, from client device 302, via support host 114. In this way, diagnostics manager 208 receives client context information for a client device experiencing a problem, and also receives the type of the problem and an indication that a diagnostics session to diagnose and/or fix the problem has been requested.

In step 404, a diagnostics database is filtered based at least on the type of the problem and the client context information. For example, context matcher 210 of FIG. 2 may be configured to filter DB 220 using filter 212. Filtering may be performed according to the received client context information and the problem type. Additionally, diagnostics package/action metadata may be used in the filtering of DB 220. That is, context matcher 210 may be configured to utilize user problem types and user information, along with the information around user devices, and match this information to diagnostics packages to diagnose and fix the problems.

Non-exhaustive examples of context matching may include the following, without limitation: package matching by error code and/or error context, package matching by problem type and device context, third party-specified context matching for flexibility with specific third party applications, and/or the like. Package matching may also be based, without limitation, on context rules that account for the following predicate keys which can include information that help application 316 passes to support host 114: a problem key such as an "IssueType" or "ErrorCode"; a problem value such as "UpdateCheck" "Audio," "Video," "MemoryAccess," "NetworkConnectivity," "DeviceConnectivity," "Credentials," "SoftwareActiviation," etc., that further describes the problem key value; an OS build identifier or version number; an OS edition; a client device manufacturer; a client device model; an OS name; and/or other predicates as would be understood by persons of skill in the relevant art(s) having the benefit of this disclosure. The matching process may also utilize comparison operations, including but not limited to, equal, not equal, greater than, greater than or equal to, less than, and/or less than or equal to, which are combined with predicate keys and problem values to form context rules for diagnostics packages/actions. For instance, a context rule for a problem key may include "problem key"-"equal"-"IssueType" or "problem key"-"equal"-"ErrorCode". Corresponding example context rules for problem values may respectively be "problem value"-"equal"-"UpdateCheck" or "problem value"-"equal"-"01879".

It is contemplated herein that update check issue types for problems may be associated with an OS (e.g., a critical update is available), or may be associated with other applications as described herein. Additionally, for examples in which the problem relates to network connectivity, e.g., it is absent (instead of present but with problems), offline functionality may be provided in association with a help application and client device.

In embodiments, fuzzy matching of context predicate keys and values may be eschewed, thus ensuring a valid and appropriate diagnostics package/action match is only returned when there is complete confidence around the matching being performed, e.g., when the predicate key value pair exactly matches the diagnostics package author-provided context. In this way, diagnostics packages are executed that are most suited to the user device and the nature of the problem. Additional details regarding diagnostics package creation, modification, and management are provided below with respect to FIG. 8.

In step 406, a diagnostics package is determined, based on the filtering, that corresponds to a diagnostic action for the type of the problem and for the client context information. For instance, based on the filtering described in step 404 above, context matcher 210 may be configured to determine a diagnostics package(s) having an action(s) that is suitable to diagnose and/or fix the problem experienced by the user at client device 302. In embodiments, a best match or an exact match determination may be used in cases where the filtering of step 406 does not eliminate all but one diagnostics package option listed in document database 230.

In step 408, a session identifier is generated to identify the diagnostics session and a diagnostics identifier is retrieved to identify at least one of the diagnostic action or the diagnostics package. For example, identification provider 214 may be configured to generate a session identifier and retrieve/select a diagnostics identifier. Session identifiers may comprise unique IDs associated with diagnostics sessions for specific client devices. A unique session identifier may include values or indications associated with the specific diagnostics session for problem help requested by the user/customer as well as information related to the user/customer and their client device. Diagnostics identifiers may be stored with diagnostics packages and or diagnostics package metadata, and may include unique IDs associated with diagnostics packages and/or diagnostic actions. That is, the diagnostics identifiers may include information that identifies a diagnostics package and a diagnostic action thereof that is to be executed for the problem. In some embodiments, diagnostics identifiers may be obtained from document database 230.

In step 410, the session identifier and the diagnostics identifier are provided to the help application via the support host. For instance, the session identifier and the diagnostics identifier selected/retrieved in step 408 may be provided from identification provider 214 and/or diagnostics manager 208 to help application 316 via SaaS platform 116 of support host 114 in FIG. 1. SaaS platform 116 of support host 114 may be configured to recognize the session identifier and associate it with the diagnostics request from client device 302 based on information associated with the communication from diagnostics hosts 202 which includes the session identifier and the diagnostics identifier. For example, header or content information may indicate that the session identifier and the diagnostics identifier are being provided responsive to the session initiation indication for the diagnostics session described in step 402. SaaS platform 116 may be configured to utilize the session identifier and the diagnostics identifier to set a session context at support host 114 for the diagnostics session.

In step 412, a request/execution initiation instruction including the session identifier and the diagnostics identifier is received from a service manager of the client device that is configured to download the diagnostics package. For instance, download manager 314 of service manager 308 may be configured to provide a request and/or an execution initiation instruction to package manager 216 of diagnostics manager 208. The session identifier and the diagnostics identifier provided by identification provide 214 in step 410 to help application 316 (via support host 114) may be included in the request/execution initiation instruction from download manager 314. Package manager 216 may be configured to receive and handle the request/execution initiation instruction.

In step 414, a location identifier for the diagnostics package that was determined is obtained and provided to the client device. For example, package manager 216 is configured to obtain a location identifier for the diagnostics package determined in step 406 that corresponds to the diagnostics identifier generated/retrieved in step 408 and provided by download manager 314 in step 412. In embodiments, package manager 216 may be configured to obtain/retrieve the location of the determined diagnostics package from unstructured data store 218. Package manager 216 may then provide a corresponding location identifier to download manager 314 of client device 302. The location identifier may be a URI or a URL in embodiments that specifies a location of unstructured data store 218 that is accessible by download manager 314.

Step 414 may include, or optionally include, an additional operation. In step 416, the service manager is caused to retrieve the diagnostics package according to the location identifier and invoke a diagnostics engine at the client device to execute the diagnostics package. For example, package manager 216 may cause or prompt download manager 314 of service manager 308 to retrieve the diagnostics package according to the location identifier and to invoke a diagnostics engine at the client device to execute the diagnostics package responsive to the location identifier for the diagnostics package being provided in step 414.

In embodiments, an executed diagnostics package that performs a diagnostic action may return results that indicate the problem is fixed, or results that indicate further additional diagnostics remediation is needed at the client device. If the problem is fixed, flowchart 400A proceeds to step 424 of flowchart 400B in FIG. 4B, and step 418, step 420, and step 422 may not be performed. If the problem is not fixed, or if another problem is detected, flowchart 400A proceeds to step 418.

In step 418, an indication of a result for the executed diagnostics package is received after its execution from the client device that indicates an additional diagnostics remediation is needed at the client device. For instance, diagnostics manager 208 may be configured to receive indications for results of executed diagnostics packages from client device 302. Results information may include key-value pairs that include information related to remaining problems at the client device, problem resolution information, new problems, and/or the like. Valid key-value pair possibilities may be specified for diagnostics packages by developers thereof, and may be described in the diagnostics package information and/or in metadata thereof. The key of a pair may identify a diagnostic action in embodiments, and the value may describe the result of the action. In step 418, the value or description may indicate the failure corresponding to the identifier for the action. Key-value pairs returned to diagnostics manager 208 for executed diagnostics packages may be stored with diagnostics package information in unstructured data store 218 and/or with metadata in DB 220.

In embodiments, if diagnostics options are exhausted, or if the problem cannot be fixed by existing diagnostics options, the user of client device 302 may be directed by diagnostics manager 208, service manager 308, and/or help application 316 to a human or virtual help/support agent for further diagnostics assistance. In such cases, the help/support agent may have access to results documents as described below.

In step 420, another diagnostics package that corresponds to another diagnostic action is determined based on the result. For example, based on the results received in step 418, context manager 210 and filter 212 may be configured to determine another diagnostics package that corresponds to another diagnostic action to be taken at client device 302, as similarly described in step 406. In embodiments, this determination may be made automatically based on results information (e.g., when results information indicates an additional problem at the client device, when the diagnostics package determined in step 406 diagnosed the problem but did not fix it, etc.). Alternatively, this determination may be made by repeating one or more of step 402, step 404, and/or step 406, or any portions thereof. For instance, result information may include indicia of a new problem, or additional information of a current problem, as a key-value pair.

Because client context information was received in step 402, and because the current diagnostics session is still ongoing, step 402 may not be repeated to determine the other diagnostics package in such scenarios. In some embodiments, a user/customer of client device 302 may provide additional information via help application 316 (e.g., through a UI of UIs 318) to determine the type of the problem or the type of another problem using support host 114 and/or natural language service 118 of FIG. 1 as described herein.

In step 422, another location identifier of the other diagnostics package is provided to the service manager client device and re-invoking the diagnostics engine to execute the other diagnostics package for execution of the further other diagnostic action in the diagnostics session under the session identifier. For example, package manager 216 is configured to obtain another location identifier for the other diagnostics package determined in step 420. Determining the other location identifier may be performed based on performing one or more of step 408, step 410, step 412, step 414, and/or step 416, or any portions thereof. For instance, actions described herein may be performed in a single diagnostics session under the same session identifier, thus, in step 408 a new session identifier may not be generated, but rather the existing session identifier is used. In another example, the other location identifier may be obtained and provided automatically based on the determined other diagnostics identifier in step 420 and without performing step 410 and step 412.

It is also contemplated herein that that step 418, step 420, and step 422 may be iteratively performed in a single diagnostics session under the same session identifier until identified problems are diagnosed and fixed, or until diagnostics options are exhausted for one or more problems. That is, a given problem, or different problems, for an application(s) of a client device may require different diagnostics packages and actions to be executed and performed. In such embodiments, any of the steps of flowchart 400A, or portions thereof, may be performed under a single session identifier. As noted above, if a problem cannot be fixed, the user may be directed to a support agent.

As noted above, if the first executed diagnostics package that performs the first diagnostic action fixes the first detected problem step 414 of flowchart 400A proceeds to flowchart 400B in FIG. 4B which begins at step 424.

In step 424, an indication of a result for the diagnostics package after its execution is received that includes a result key identifier and a result key description that indicate the problem at the client device is fixed. For instance, diagnostics manager 208 is configured to receive results of executed diagnostics packages for performance of diagnostic actions as similarly described above in step 418 of flowchart 400A, but in embodiments for flowchart 400, the result indicates that the problem is fixed.

In step 426, a session results document for the diagnostics session that includes the session identifier and at least one of: the diagnostics identifier, the indication, the type, the problem, or the client context information is stored. For example, diagnostics manager 208 is configured to store session results documents in DB 220, according to embodiments. Session results documents may include at least one of the session identifier, the diagnostics identifier, the indication, the type, the problem, or the client context information. Once stored, session results documents may be made available to support agents (e.g., automated agents or human agents) by a call or request for such documents. Calls and requests may be made according to session identifiers, user names, diagnostic package names or identifiers, and/or other information stored in the session results documents.

Turning now to FIG. 5, a flowchart 500 for configurable and proactive application diagnostics and recovery is shown, in accordance with an example embodiment. As noted above with respect to FIGS. 1 and 2, SaaS platform 116 and/or support host 114 may be conceptually, logically, and/or physically grouped together with diagnostics host 104 as part of a diagnostics system. One or more components of system 100 of FIG. 1, system 200 of FIG. 2, and/or system 300 of FIG. 3 may operate according to flowchart 500. Further structural and operational examples will be apparent to persons skilled in the relevant art(s) based on the following description. Flowchart 500 may be a further embodiment of flowchart 400A of FIG. 4A and/or flowchart 400B of FIG. 4B, and is described as follows with respect to system 100 of FIG. 1, system 200 of FIG. 2, and system 300 of FIG. 3.

Flowchart 500 begins at step 502. In step 502, the client context information and a request for a diagnostics session are received from the help application of the client device, the request for the diagnostics session including a description the problem and an identity token. For instance, SaaS platform 116 of support host 114 may be configured to receive client context information and a request for a diagnostics session that includes a description the problem experienced at the user/customer device, e.g., client device 302. The request may also include a token that specifies the identity of the user/customer and/or client device 302. That is, in embodiments, the identity tokens may be device-specific and/or device-bound tokens that identify both the user as well as the user's device to enable a single diagnostics session during which local and remote diagnostics packages may be exected natively at client device 302.

In step 504, the identity token is validated. For example, SaaS platform 116 may be configured to validate the identity toked provided in step 502. SaaS platform 116 may validate the token based on a digital signature therein provided from an authentication host that transmits the identity token to a user when help application 316 is invoked.

In step 506, a type of the problem is obtained utilizing a determination service associated with the SaaS platform, the determination service configured to determine types of problems based at least on the client context information and the description the problem. For instance, SaaS platform 116 may be configured to provide the client context information and the description the problem to a determination service such as natural language service 118, which may utilize the information and description. That is, language service 118 is configured to interpret natural language information from the user in the form of problem descriptions and to match this information, within the client context, to a diagnostic action decision tree such that a proper diagnostics package and action may be determined to diagnose and/or remedy the problem of client device 302. Natural language service host 118 may also be configured to instruct support host 114 to initiate a diagnostics session to take action for the problem.

In embodiments, step 504 and step 506 may be performed sequentially, concurrently, concurrently in part, etc. That is, even if the user of user device 302 is not validated through the identity token, information regarding a reported problem may still be collected by SaaS platform 116 and/or the determination service.

In step 508, the client context information, the type, and the session initiation indication are provided to the diagnostics manager subsequent to validating the identity token. For instance, SaaS platform 116 may be configured to provide the client context information, the type, and the session initiation indication to diagnostics manager 208 upon validating the identity token, e.g., as similarly described above with respect to step 402 of flowchart 400A. In embodiments, a communication from SaaS platform 116 that includes the client context information and the type of the problem may itself be the session initiation indication as recognized by diagnostics manager 208, while in other embodiments, additional information may be included in such a communication to be recognized by diagnostics manager 208.

After step 508, one or more steps of flowchart 400A in FIG. 4A may be performed as described above, e.g., one or more of step 404 through step 416, and/or one or more steps of flowchart 400B in FIG. 4B may be performed as described above, e.g., one or more of step 424 through step 426.

In step 510, an indication of a result of the diagnostics package executed at the client device is received subsequent to its execution. For example, SaaS platform 116 may be configured to receive results of a diagnostic action of the executed diagnostics package from client device 302, e.g., from help application 316. In embodiments, step 510 may be performed sequentially, concurrently, or partially concurrently with step 418 of flowchart 400A in FIG. 4A, as described above.

In step 512, the indication of the result is provided to a determination service, the determination service configured to determine the other type of the other problem based at least on the indication of the result and to update a machine learning determination algorithm based at least on the indication of the result. For instance, SaaS platform 116 may be configured to provide received result information of executed diagnostics packages to natural language service 118. The indication of the result may include indicia of an additional problem(s) at client device 302 and/or may indicate that the original problem has not been fixed. Natural language service 118 may be configured to determine a type of another problem based at least on the indication of the result and to update a machine learning determination algorithm for problem type determinations based at least on the indication of the result.

In step 514, the other type of the other problem is received from the determination service. For example, SaaS platform 116 may be configured to receive, from natural language service 118, another type of another problem for client device 302 in the same diagnostics session under the same session identifier. This other type may be a variation of the original type determination, or may be a different type determination for a different problem. In embodiments, the provision of the other type may comprise a diagnostic continuation instruction for the diagnostic session under the same session identifier.

In step 516, the session identifier, another type of another problem, and a continuation instruction are provided to the diagnostics manager based at least on the indication of the result. For instance, SaaS platform 116 may be configured to provide the same session identifier, the other type, and a continuation instruction for the same diagnostic session to diagnostics manager 208 of system 200 in FIG. 2. Accordingly, the indication of the result received in step 510 may cause another type of a problem to be provided to diagnostics manager 208 to continue the performance of diagnostics for the active diagnostics session.

Subsequent to step 516, flowchart 500 may end and/or step 420 of flowchart 400A in FIG. 4A may be performed again. Additionally, one or more of the steps of flowchart 500 may be iteratively performed, in whole or in part, for further problems and/or needed diagnostics packages for a single problem.

Turning now to FIG. 6, a flowchart 600 for configurable and proactive application diagnostics and recovery is shown, in accordance with an example embodiment. One or more components of system 100 of FIG. 1, system 200 of FIG. 2, and/or system 300 of FIG. 3 may operate according to flowchart 600. Further structural and operational examples will be apparent to persons skilled in the relevant art(s) based on the following description. Flowchart 600 may be a further embodiment of flowchart 400A of FIG. 4A and/or flowchart 500 of FIG. 5, and is described as follows with respect to system 100 of FIG. 1, system 200 of FIG. 2, and system 300 of FIG. 3.

As described above with respect to flowchart 400A and flowchart 500, results of the execution of diagnostics packages may indicate that a problem is not yet fixed. In such cases, additional diagnostics packages and diagnostic actions may be applied. Accordingly, more than one diagnostics package and diagnostic action may provide results during a single diagnostics session in embodiments.

Flowchart 600 begins at step 602. In step 602, subsequent to receiving another indication of another result for the other diagnostics package after its execution that indicates the problem is resolved, a session results document is stored for the diagnostics session that includes the session identifier and at least one of: the diagnostics identifier, the other diagnostics identifier, the indication, the other indication, the type, the problem, or the client context information. For instance, diagnostics manager 208 may be configured to receive results of executed diagnostics packages for performance of diagnostic actions as similarly described above in step 424 of flowchart 400B. When a problem is resolved or fixed through execution of two or more diagnostics packages for a single diagnostics session under a single session identifier, diagnostics manager 208 may store an associated session results document. The session results document for the diagnostics session may include at least one of the single session identifier, the diagnostics identifiers of any packages executed for the diagnostics session, the results indications, the type of the problem or the types of the problems, descriptions of the problem(s), or the client context information. Diagnostics manager 208 is configured to store session results documents in DB 220, according to embodiments.

In step 604, a request for the session results document is received subsequent to said storing. For instance, once stored, session results documents may be made available to support agents (e.g., automated agents or human agents). In embodiments, support automated or virtual agents may reside in help application 316 of client device 302, while human agents may be users of client device 302 with access to help application 316. Session results documents may be made available to support agents by a call or request for such documents via diagnostics manager 208. Calls and requests may be made according to session identifiers, user names, diagnostic package names or identifiers, and/or other information stored in the session results documents. In some embodiments, calls or requests may be made via an API of APIs 312 of service manager 308 in system 300, such as from help application 316, to diagnostics manager 208.

In step 606, the session results document is provided to a support agent. For example, diagnostics manager 208 may be configured respond to requests or calls for session results documents by retrieving such session results documents from DB 220 and providing the session results documents back to the requesting/calling client device.

FIG. 7 shows a flow diagram 700 for configurable and proactive application diagnostics and recovery, according to an example embodiment. Diagnostics manager 208 of diagnostics host 202 in system 200 may operate according to flow diagram 700. Further structural and operational examples will be apparent to persons skilled in the relevant art(s) based on the following description. Flow diagram 700 may be an embodiment of flowchart 400A of FIG. 4A. Flow diagram 700 is described as follows with respect to system 200 of FIG. 2.

Flow diagram 700 depicts interaction of components of diagnostics manager 208 with DB 220 for performance of context matching, filtering, and identifier generation/selection, as generally described above in flowchart 400A of FIG. 4A, e.g., step 402 through step 408. For example, context matcher 210, filter 212, and identification provider 214 of diagnostics manager 208 are shown in flow diagram 700 with DB 220.

In step 702, context matcher 210 requests to retrieve a listing of diagnostics packages and diagnostic actions from DB 220 as exemplarily shown in a listing 720. In embodiments, the diagnostics packages and diagnostic actions have metadata associated therewith. It should be noted that examples for diagnostics package names, identifiers, context rules, and metadata are shown for illustrative purposes and are not to be considered exhaustive or limiting. It is contemplated that more or less information, as described herein for diagnostics packages and diagnostic actions, as well as metadata therefor, may be included. For example, metadata for a diagnostics package/action may include at least one of a diagnostics package name, a diagnostics package description, an author, a version, a creation date, a help article identifier, an expected type for problems, client device information, a result key identifier, a result key description, a privacy URL, and/or the like. Step 702 may be performed based at least on step 402 of flowchart 400A in which client context information and a type of a problem are received from support host 114, e.g., by SaaS platform 116.

In step 704, the listing of the listing of diagnostics packages and diagnostic actions, and their associated metadata, is returned by DB 220 to context matcher 210. The listing and the metadata may be cached by context matcher 210 and/or diagnostics manager 208 for performance of the filtering described herein. In embodiments, the listing and metadata may be cached for a predetermined period of time such as a number of seconds, minutes, etc. In other words, matching operations of context matcher 210 and filter 212 may be performed during diagnostics session creation time to match user-described problems and types, along with device context information, to an appropriate diagnostics package/action to diagnose and/or fix the problem.

Based on the type and the client context information received, context matcher 210 is configured to apply rules for filter 212 against listing 720, including diagnostics package and action metadata, in step 706 to match the client context and type of problem to a diagnostics package-action pair. For instance, context matcher 210 is configured to analyze sets of context rules of diagnostics packages/actions for each entry in the listing against the client context information and the type. Context rules for matching and filtering are described above with respect to step 404 and step 406 of flowchart 400A. In embodiments, context rules are converted to binary expressions during runtime, and the user-described problems and types, along with device context information from the diagnostics request is evaluated against the context rules. If all (or some in embodiments) of the context rules of a given diagnostics package-action pair match the request data, that pair is added to a set of matched diagnostics package-action pairs. Filtering results based on the rules of filter 212 may be obtained or determined by context matcher 210 in step 708. That is, once filtering operations of step 706 complete if there is only one match then that diagnostics package-action pair is returned, otherwise the oldest diagnostics package-action pair may be chosen. However, matches are desired in embodiments, and authoring considerations for context rules in diagnostics packages, as described below in FIG. 8, may prevent conflict scenarios where more than one diagnostics package-action pair is matched by context matcher 210.

In step 710, context matcher 210 of diagnostics manager 208 is configured to determine the appropriate diagnostics package and action by determining at least one matching diagnostics package-action pair for which the corresponding set of context rules is met by the client context information and the type. Also in step 710, context matcher 210 is configured to select the diagnostics package associated with the at least one matching diagnostics package-action pair. That is, a best or exact match is selected.

In step 712, an indication of the selected diagnostics package is provided to identification provider 214, which may request the diagnostics identifier for the selected diagnostics package/action from DB 220 in step 714. In step 716, the requested diagnostics identifier is provided back to identification provider 214 from DB 220.

In some embodiments, identification provider 214 may be configured to request, and/or receive, the diagnostics identifier from context matcher 210 subsequent to step 710 being performed. That is, context matcher 210 may determine the diagnostics package and action having an associated diagnostics identifier as described above, and identification provider 214 may query context matcher 210 directly for, or automatically receive from context matcher 210, the diagnostics identifier.

In step 718, the listing and metadata are de-cached when the predetermined caching period expires. By de-caching the listing and metadata based on expiration of caching timer, memory of diagnostics manager 208 and diagnostics host 202 may be freed thus increasing the memory available for the system to perform other tasks.

Embodiments described herein for configurable and proactive application diagnostics and recovery also support the creation, modification, and deployment of diagnostics packages for problems. For instance, a customer support team (e.g., administrators, engineers, technicians, etc.) may track customer support problems as seen by support agents, system/application data/telemetry, and/or the like. These tracked problems may be used to identify a list of top customer impacting problems or frequently occurring problems. Based on this tracking, a diagnostic action(s) may be developed to diagnose and/or resolve such problems to improve customer satisfaction and client device performance, as well as improving the efficiency and efficacy of the embodiments herein. When actions are built, they may be packaged, digitally signed, and published as described herein for access to diagnose/fix problems. Additionally, diagnostics package/action metadata may be published that defines what the action is, result keys it will output when executed and what they mean, etc. Further, the filtering conditions around how new diagnostic action should be matched may be published (e.g., different context values to be matched when determining proper actions to select).

Referring now to FIG. 8, a block diagram of a host system 800 ("system" 800 herein) is shown for configurable and proactive application diagnostics and recovery, in accordance with an example embodiment. System 800 is an embodiment of system 200 in FIG. 2. For instance, system 800 includes diagnostics manager 208 as described in system 200 above with the previously-described components not explicitly shown for brevity and illustrative clarity. Additionally, unstructured data store 218 and DB 220 are shown in FIG. 8. System 800 is described as follows.

In the embodiment illustrated for system 800, diagnostics manager 208 includes a developer UI(s) 802 and a signature manager 804. Developer UI(s) 802 of diagnostics manager 208 may be configured to provide a user interface(s) for use by package developers and configured to receive inputs to define new diagnostics packages and to modify existing diagnostics packages. Developer UI(s) 802 may be accessed via portal through a browser, may be accessed via a help application as described herein, and/or the like.

For instance, a UI of developer UI(s) 802 may be provided for viewing and accepting inputs by a user/customer at a display 806. The UI may include a field 808 for accepting developer inputs for creating diagnostics package definitions. That is, a developer may use field 808 to create or modify a diagnostics package via diagnostics manager 208 and store diagnostics packages in unstructured data store 218.

Additionally, developer UI(s) 802 of diagnostics manager 208 may be configured to provide a user interface(s) for use by package developers and configured to receive inputs to define or modify metadata. For example, a field 810 may be provided, through the UI of developer UI(s) 802 at display 806, to accept developer inputs for creating or modifying diagnostics package/action metadata, as described herein.

Developer UI(s) 802 may also be configured to provide a user interface(s) with controls 812. Controls 812 may include one or more selectable elements for performing operations associated with developer UI(s) 802. For example, controls 812 may include selectable buttons, menus, etc., for saving user inputs to files in unstructured data store 218 and DB 220, for initiating digital signature generation, for opening/closing files to be edited, for creating new files to receive inputs to define new diagnostics packages or metadata, and to modify existing diagnostics packages/metadata, for deleting files, and/or the like. Simply put, using controls 812 enables various functionality provided through developer UI(s) 802 and/or signature manager 804 of diagnostics manager 208.

When creating a new diagnostics package/action, or modifying existing diagnostics packages/actions, the authoring entity may be required by developer UI(s) 802 and/or diagnostics manager 308 via developer UI(s) 802, to provide details around the package context, such as how the package will be matched, in addition to the regular details. For example, "problem key" and "problem value" entries may be mandatory context rules required while the other predicate keys may be optional. In embodiments, the authoring entity may not be allowed to create or modify diagnostics packages/actions which match the same context rules as done by another diagnostics packages/actions. For instance, developer UI(s) 802 and/or diagnostics manager 308 via developer UI(s) 802 may be configured to perform a validation check during authoring time before diagnostics packages/actions may be committed to storage.

Accordingly, diagnostics manager 208 through developer UI(s) 802 is configured to enable the storage of diagnostics packages and metadata associated therewith, in unstructured data store 218 and DB 220, respectively. Likewise, diagnostics manager 208 through developer UI(s) 802 is configured to delete existing diagnostics packages and modified diagnostics packages.

Still further, diagnostics manager 208 through signature manager 804 is configured to digitally sign new diagnostics packages and modified diagnostics package prior to storage thereof in an unstructured data store, such as unstructured data store 218. In embodiments, signature manager 804 is configured to digitally sign diagnostics packages using a digital shared access signature. Digital signatures may be created and applied according to the described embodiments to establish that signed diagnostics packages are certified through a chain of trust up to a trusted root entity. Accordingly, validation of digital signatures for diagnostics packages provide security improvements through recognition of trusted entities.

2. Client-Side Diagnostics Examples

As noted above, systems and devices such as diagnostics systems and devices, e.g., system 100, client device 102, diagnostics host 104, and/or support host 114 described above with respect to FIG. 1 and in the prior subsection, may be configured in various ways for improvements and enhancements in configurable and proactive application diagnostics and recovery. Client-side diagnostics examples are provided in this subsection with reference to system 100 of FIG. 1, system 200 of FIG. 2, system 300 and client device 302 of FIG. 3 described above.

For instance, system 300 and client device 302 are configured to perform client-side operations for configurable and proactive application diagnostics and recovery. FIG. 9 shows a flowchart 900, in accordance with an example embodiment. Service manager 308 of client device 302 may operate according to flowchart 900. Further structural and operational examples will be apparent to persons skilled in the relevant art(s) based on the following description. Flowchart 900 is described as follows.

Flowchart 900 begins with step 902. In step 902, client context information is determined for a device of a user. For instance, help application 316 may be configured to determine client context information of client device 302. In embodiments herein, client context information may be utilized by systems and devices to determine diagnostics packages to execute for problems at client device 302. Client context information includes, without limitation, information about the user's history, the user's profile, the client device, etc. Some non-exhaustive examples of client context information include a device name, make, and/or model, an OS installed at the device (e.g., name, edition, version, etc.), a user identifier (ID) and/or account profile, a purchase history, a usage history, application logs and/or error logs (which may be related to a current problem at user device 302), and/or the like.

In step 904, user input is received at a help application executing at the device, the user input including a problem description of a problem of the device. For example, help application 316 executing at client device 302 may be configured to receive user inputs via a UI of UIs 318. The UI may be launched by help application 316 for viewing and interaction by the user when the user invokes help application 316. The UI may include fields for natural language inputs and/or selectable options that describe the problem at client device 316, and also may include a selectable control to submit the inputs to help application 316 when complete.

In step 906, the client context information and the problem description are provided to a support host. For instance, help application 316 is configured to provide the client context information gathered and the problem description entered by the user to support host 114 of FIG. 1, as described with respect to step 502 in flowchart 500 of FIG. 5.

In embodiments, one or more steps, in whole or in part, of flowchart 400A of FIG. 4A and/or flowchart 500 may be performed subsequent to step 906 of flowchart 900. For example, in embodiments, flowchart 900 may continue at step 908 subsequent to step 410 of flowchart 400A.

In step 908, a diagnostics execution manager is invoked by the help application based at least on receiving at the help application from the support host a session identifier for a diagnostics session and a diagnostics identifier associated with both a diagnostics package and the problem description, the diagnostics execution manager configured to execute diagnostics packages as native actions for the device. For instance, help application 316 may receive from support host 114 a session identifier for a diagnostics session and a diagnostics identifier associated with both a diagnostics package and the problem description. In embodiments, support host 114 may receive this information from diagnostics host 208 of FIG. 2, as described in step 410. After receiving the information, help application 316 is configured to make a call, e.g., via an API of API(s) 312, to invoke execution manager 310 of service manager 308. Execution manager 310 is configured to execute diagnostics packages as native actions for client device 302 through a diagnostics engine that may be a scripted engine.

In step 910, the session identifier and the diagnostics identifier are provided from the help application to the diagnostics execution manager. For example, when execution manager 310 is invoked, help application 316 is configured to provide the session identifier and the diagnostics identifier to execution manager 310.

In step 912, a download manager configured to provide the diagnostics identifier to a diagnostics host is invoked by the diagnostics execution manager. For instance, execution manager 310 is configured to invoke download manager 314 based at least on receiving the session identifier and the diagnostics identifier, and to provide the identifiers to download manager 314. When download manager 314 is invoked and receives the session identifier and the diagnostics identifier, download manager 314 may be configured to provide the identifiers to diagnostics host 202, e.g., to package manager 216, in order to receive back a location identifier associated with the identified diagnostics package. This provision may be an execution initiation instruction for starting the execution of diagnostics packages at client device 302. In embodiments, step 412 through step 416 of flowchart 400A may be performed after step 912.

In step 914, a location identifier for the diagnostics package is received, the location identifier specifying a location at a remote data store. For example, download manager 314 is configured to receive the location identifier for the diagnostics package from package manager 216. The location identifier may be a URL, URI, and/or the like, that includes information associated with the location of the desired diagnostics package at unstructured data store 218 of system 200.

In step 916, the diagnostics package is retrieved from the remote data store according to the location identifier. For instance, download manager 314 is configured to retrieve the diagnostics package from unstructured data store 218 according to the location identifier. As noted herein, client device 302, e.g., via download manager 314, may have access to unstructured data store 218 for the purposes of retrieving diagnostics packages. Retrieval may be performed by request or API call to package manager 216, and accesses may be allowed at all times based on calls/requests, or may be allowed for limited periods of time based on receipt of diagnostics identifiers, location identifiers, etc., by client device 302 in different embodiments. When retrieved from unstructured data store 218 via package manager 216 as described in step 414 of flowchart 400A, the diagnostics package may be stored by download manager 314 at a predetermined or known location, e.g., as part of diagnostics package(s) 322 of client device 302.

In step 918, a digital shared access signature of the diagnostics package is authenticated subsequent to said retrieving and prior to said executing the diagnostics package. For example, diagnostics packages may be created and then digitally signed by signature manager 804 of diagnostics manager 208 as shown in FIG. 8. The digital signature may be a shared access signature, in embodiments. Download manager 314 or execution manager 310 may be configured to authenticate the digital signature prior to executing the diagnostics package. As noted above, the digital signature may be validated to ensure a certificate of trust up to a recognized root entity for added security.

In step 920, the diagnostics package is executed as a background process and as a native action at the device by the diagnostics execution manager under the session identifier in the diagnostics session. For instance, after the diagnostics package is downloaded and stored, download manager 314 may return control of diagnostics operations to execution manager 310. Execution manager 310 is configured to execute the diagnostics package as a native action with respect to the OS of client device 302. Additionally, the diagnostics package may be executed silently as a background process and/or without further inputs from or notifications to the user/customer of client device 302 during execution. Execution is performed by execution manager 310 in the diagnostics session and under the session identifier. In embodiments, execution may be performed as an on-demand background process that may, e.g., begin when control is returned to execution manager 310 and may end or close, e.g., once the diagnostic action itself is being performed.

In step 922, a result of execution of the diagnostics package is provided to at least one of the diagnostics host or the support host. For example, one of diagnostics manager 308 or help application 316 may be configured to provide a result and/or results information to diagnostics host 202 of FIG. 1 and/or support host 114 of FIG. 1, as similarly described in flowchart 400A of FIG. 4 and flowchart 500 of FIG. 5.

Subsequent to or concurrently with step 922, help application 316 may determine if the problem is fixed. Help application 316 may be configured to determine if the problem is fixed by comparing expected results of the diagnostics package execution and performance of the diagnostic action with actual results, as described elsewhere herein. In embodiments, when actual results indicate a problem is fixed, service manager 308, or help application 316 through UI(s) 318, may prompt the user to indicate or verify if the problem is fixed or not. If the problem is fixed, flowchart 900 may end. If the problem is not fixed, or if a new problem is determined or identified based on the results and/or additional user inputs via UI(s) 318, flowchart 900 may return from step 922 to step 904 or step 906 to continue the diagnostics session and under the same session identifier. In such cases, the repeated steps may be performed iteratively until all problems are fixed or until all diagnostics options are exhausted. Subsequent performance of steps of flowchart 900 may be performed with additional or the same diagnostics packages, additional or the same client context information, additional or the same problem descriptions, etc.

In embodiments, if diagnostics options are exhausted, or if the problem cannot be fixed by existing diagnostics options, the user of client device 302 may be directed by diagnostics manager 208, service manager 308, and/or help application 316 to a human or virtual help agent for further diagnostics assistance. In such cases, the help/support agent may have access to results documents as described elsewhere herein.

B. Additional Example Embodiments of Systems and Devices for Configurable and Proactive Application Diagnostics and Recovery Methods Additional host- and client-side embodiments are also provided herein. That is, a diagnostics host such as diagnostics host 202 of FIG. 2 and a client device such as client device 302 of FIG. 3 may be configured in further ways for enhancements and improvements in configurable and proactive application diagnostics and recovery.

1. Hybrid Local-Remote Diagnostics Package Execution

For example, FIG. 10 shows a block diagram of a diagnostics system 1000 ("system 1000" herein) for configurable and proactive application diagnostics and recovery, according to an example embodiment. System 1000 is an embodiment of system 100 in FIG. 1 and system 300 in FIG. 3. For instance, system 1000 includes client device 302 as described in system 300 above with various previously-described components not explicitly shown for brevity and illustrative clarity. Additionally, network 110 of system 100 in FIG. 1 is also shown in FIG. 10. System 1000 is described as follows.

As shown, client device 302 of system 1000 includes help application 316 and service manager 308, which are described in detail above. Client device 302 also includes one more installed applications 1004 ("applications 1004" herein). Applications 1004 may be any type of application installed at client device 302 that not within an operating system of client device 302. That is, applications 1004 are not part of any operating system installed at client device 302.

System 1000 also includes an authentication service host 1002 that is configured to communicate with client device 302 over network 110. Authentication service host 1002 may comprise one or more server computers or computing devices, which may include one or more distributed or "cloud-based" servers. Authentication service host 1002 may be configured to host an authentication service that is configured to authenticate users/customers and/or client devices such as client device 302 based on authentication requests. Authentication may be performed against credentials and/or other authentication information for users/customers and/or client devices, and identification tokens may be provided to client devices that are authenticated. In embodiments, identification tokens may identify users/customers and/or client devices (e.g., when both are identified in a token, such a token may be referred to as a device-specific and/or device-bound token). The use of device-specific and/or device-bound tokens herein provides additional security by requiring matches in customer/user and client device identifiers, and also may increase accuracy and efficiency of diagnostics package determinations. Authentication service host 1002 may be associated with a diagnostics host and/or a support host as described herein for purposes of authentication and access to systems and services.

Turning now to FIG. 11, a flowchart 1100 for configurable and proactive application diagnostics and recovery is shown, according to an example embodiment. Service manager 308 and help application 316 of client device 302 of FIGS. 3 and 10 may operate according to flowchart 1100. Further structural and operational examples will be apparent to persons skilled in the relevant art(s) based on the following description. Flowchart 1100 is described as follows.

Flowchart 1100 begins with step 1102. In step 1102, a remote authentication service a token request for an identification token is transmitted to subsequent to invocation of the diagnostics interface by the user, the token request including authentication information associated with the user and the diagnostics system. For example, help application 316 may be configured to transmit a token request to authentication service host 1002 over network 110. In embodiments, help application 316 may include UI(s) 318 as described above with respect to FIG. 3. A diagnostics UI of UI(s) 318 may be invoked by help application 316 subsequent to a customer/user invoking help application 316. Help application 316 may thus be enabled to transmit the token request after or currently with providing the diagnostics UI for viewing by the customer/user. The token request may include authentication information associated with the user and the diagnostics system (e.g., client device 302, in an embodiment) that is provided by the user via the diagnostics UI and/or by client device 302.

In step 1104, the identification token is received and the user is authenticated based on the identification token. For instance, help application 316 may be configured to receive the identification token from authentication service host 1002 based on the token request provided in step 1102. Help application 316 may also be configured to authenticate the user based on the received identification token.

In step 1106, a service manager is invoked by a help application based on a user being authenticated. For instance, service manager 308 is configured to be invoked by help application 316, and help application 316 is configured to perform the invocation. In embodiments, help application 316 is configured to invoke service manager 308 based on the user being authenticated in step 1106. That is, when a customer/user launches help application 316 and provides log-in credentials via the diagnostics UI to start a diagnostics session, service manager 308 is invoked when the user is authenticated to use help application 316 via the diagnostics UI.

In step 1108, a local diagnostics package is executed for a problem in a context of the diagnostics system. For example, execution manager 310 of service manager 308 as described with respect to FIG. 3 above may be configured to execute local diagnostics packages such as diagnostics package(s) 322. The local diagnostics package may be determined based on a local listing of diagnostics package(s) 322 and associated metadata, and in embodiments, a locally stored listing of types of problems may also be used to identify the correct local diagnostics package to execute for the problem. Furthermore, a customer/user may enter a problem description via the diagnostics UI that may be used to determine the local diagnostics package as similarly described elsewhere herein.

In step 1110, the identification token, that identifies the diagnostics system and the user, and a remote diagnostics package request are transmitted to a remote diagnostics service over a network based at least on first results information associated with the executed local diagnostics package. For example, results information may be generated after the local diagnostics package executes in step 1108, and help application 316 may be configured to provide the identity token, the results information, and a request for a remote diagnostics package to a remote diagnostics service such as diagnostics host 202 of FIG. 2. In embodiments, the request may be provided to the remote diagnostics service via support host 114, as similarly described above with respect to step 402 of flowchart 400A in FIG. 4 and step 502 of flowchart 500 in FIG. 5. Additionally, client context information associated with client device 302 and/or a problem description may be included in the request.

The remote diagnostics package request may be a continuation of the same diagnostics session associated with the execution of the local diagnostics package noted above. In such embodiments, diagnostics manager 208 of diagnostics host 202 in FIG. 2 may generate a session identifier for the diagnostics session based at least on the remote diagnostics package request, and the local diagnostics package execution may be associated therewith based on the provided results information.

In step 1112, a remote diagnostics package for the problem is received over the network based at least on the identification token and the remote diagnostics package request. For instance, download manager 314 of service manager 308 as described with respect to FIG. 3 above may be configured to receive the remote diagnostics package over network 110. In embodiments, the remote diagnostics package may be determined and provided according to one or more steps of flowchart 400A in FIG. 4 and/or step 502 of flowchart 500 in FIG. 5, or similarly thereto.

In step 1114, the remote diagnostics package is executed in the context of the diagnostics system. For example, execution manager 312 may be configured to execute the remote diagnostics package, e.g., via an execution engine, as described herein. Accordingly, based on the identification token, e.g., a device-specific and/or device-bound token, a remote diagnostics package and a local diagnostics package may be executed at a client device in a single diagnostics session. The remote diagnostics package may be executed such that the diagnostic action associated therewith is run as a native process for the client device.

In step 1116, second results information associated with the executed remote diagnostics package is transmitted to the remote diagnostics service over the network. For example, as noted above results information may be generated after the diagnostics packages execute, such as the execution of the remote diagnostics package in step 1114. Help application 316 may be configured to provide the second results information for the remote diagnostics package to a remote diagnostics service such as diagnostics host 202 of FIG. 2 (e.g., via support host 114).

The second results information may include any information described herein for results of diagnostics package execution, such as but not limited to, key-value pairs that include information related to remaining problems at the client device, problem resolution information, new problems, and/or the like. Subsequent to or concurrently with step 1116, help application 316 may determine if the problem is fixed. Help application 316 may be configured to determine if the problem is fixed by comparing expected results of the remote diagnostics package execution and performance of the diagnostic action with actual results, as described elsewhere herein. If the problem is fixed, flowchart 1100 may end. If the problem is not fixed, or if a new problem is determined or identified based on the results and/or additional user inputs via the diagnostics UI, flowchart 1100 may return from step 1116 to step 1110 to continue the diagnostics session and under the same session identifier and with the same identity identification token. In such cases, the repeated steps may be performed iteratively until all problems are fixed or until all diagnostics options are exhausted. Subsequent performance of steps of flowchart 1100 may be performed with additional or the same diagnostics packages, additional or the same client context information, additional or the same problem descriptions, etc.

In embodiments, if diagnostics options are exhausted, or if the problem cannot be fixed by existing diagnostics options, the user of client device 302 may be directed by diagnostics manager 208, service manager 308, and/or help application 316 to a human or virtual help agent for further diagnostics assistance. In such cases, the help/support agent may have access to results documents as described elsewhere herein.

2. Diagnostics Package UIs and Localizing Remote Diagnostics Packages

FIG. 12 shows a flowchart 1200 for configurable and proactive application diagnostics and recovery, according to an example embodiment. Service manager 308 and help application 316 of client device 302 of FIGS. 3 and 10 may operate according to flowchart 1200. Flowchart 1200 may be a further embodiment of flowchart 1100 in FIG. 11. Further structural and operational examples will be apparent to persons skilled in the relevant art(s) based on the following description.

In embodiments, customer/users of different client devices 302 may perform the steps of flowchart 1100 and provide result information to support host 114 of FIG. 1 and/or diagnostics host 202 of FIG. 2. It may be determined that a specific problem or type of problem is reported or fixed frequently based on the steps of flowchart 1100. In embodiments, result information provided to support host 114 of FIG. 1 may be further provided to natural language service 118 of FIG. 1 where machine learning techniques are applied to make a determination of whether, or when, to include additional diagnostic actions and/or diagnostics packages as persistently stored, local diagnostic actions and diagnostics packages. Accordingly, the steps of flowchart 1200 may be performed. Flowchart 1200 is described as follows.

Flowchart 1200 begins with step 1202. In step 1202, code for executing a diagnostic action of the remote diagnostics package is stored in the local diagnostics package subsequent to execution of the remote diagnostics package, or the remote diagnostics package is stored with the local diagnostics package as another local diagnostics package at the diagnostics system subsequent to execution of the remote diagnostics package. For instance, as described above in flowchart 1100, a remote diagnostics package may be executed at client device 302 for a problem. In some embodiments, the remote diagnostics package may be stored locally at client device 302, e.g., as one of diagnostics package(s) 322 that is persistently stored, based on the frequency of the problem occurrence. In other embodiments, code for executing a diagnostic action associated with the remote diagnostics package may be stored locally at client device 302, e.g., in of diagnostics package(s) 322 that is persistently stored, based on the frequency of the problem occurrence. In each case, an update to help application 316 may be used to affect the storage, diagnostics packages may be individually stored or modified, etc.

In step 1204, it is determined if the remote diagnostics package is stored as another local diagnostics package, or if the code for executing the diagnostic action is added to the local diagnostics package. If the remote diagnostics package is stored, flowchart 1200 proceeds to step 1208. If not, flowchart 1200 proceeds to step 1206.

In step 1206, the local diagnostics package that includes the code for executing the diagnostic action is executed based at least on a subsequent diagnostics request of the user. For instance, the addition of the code for executing the diagnostic action to the local diagnostics packages enables execution manager 310 of diagnostics manager 308 to perform the diagnostic action locally, without a call for a remote diagnostics package, during a subsequent diagnostics request.

In step 1208, execute the local diagnostics package and the other local diagnostics package are executed based at least on a subsequent diagnostics request of the user. For instance, the addition of the remote diagnostic action as one of the persistently stored local diagnostics packages enables execution manager 310 of diagnostics manager 308 to perform the diagnostic action locally through local execution, without a call for a remote diagnostics package, during a subsequent diagnostics request.

In embodiments, the steps of flowchart 1200 may be performed for configurable and proactive application diagnostics and recovery of applications within an OS of client device 302, or for applications that are not within any OS of client device 302, such as installed applications 1004 of FIG. 10.

Accordingly, remote diagnostics packages may be migrated to local diagnostics packages based on the frequency of problems to which the remote diagnostics packages are applied. Migrated diagnostics packages may be selectively chosen based on frequency of associated problems over a large customer/user base to balance memory usage at client devices against increased availability, faster request-to-execution time, and decreased network bandwidth/host load utilizations.

As noted herein, systems and devices may be configured in various ways for enhancements and improvements in configurable and proactive application diagnostics and recovery. In embodiments, client devices and/or systems/storage remote thereto may include one or more diagnostics packages configured to provide their own UIs. That is, execution of such diagnostics packages causes program code thereof to provide a UI for display to a customer/user as well as interaction and inputs from the customer/user. Additionally, applications outside of client device operating systems may be enabled to directly invoke local diagnostics packages for execution against known types of problems.

FIG. 13 shows a block diagram of a diagnostics system 1300 ("system 1300" herein) for configurable and proactive application diagnostics and recovery, according to an example embodiment. System 1300 may be an embodiment of any client device and/or processing device described herein. System 1300 is described as follows.

System 1300 includes an application 1302, an OS 1306, a diagnostics package 1308, and a problem set 1312. Also shown in FIG. 13 is a display 1314 that may be a component of system 1300 in embodiments. While not shown for illustrative clarity and brevity, system 1300 may include components described with respect to other client devices described herein, such as but not limited to, a processor(s), a memory(s), other storage components, a network interface, a service manager, and/or the like.

Display 1314 may be any type of display described herein such as, but without limitation, a desktop computer monitor, a touchscreen, a television, a flat panel display (e.g., for a portable/mobile computing device), and/or the like. Display 1314 may be configured to display components of UIs to customers/users to provide information and allow interactions and inputs by the customers/users.

OS 1306 may be any type of operating system(s) that can be installed and run by a processing/computing device. OS 1306 may include a UI and one or more applications (not shown) which may be presented to customers/users via display 1314. In embodiments, OS 1306 may include a help application, such as help application 316 of client device 302 in FIG. 3.

Application 1302 may be any type of application installed at a client device, such as client device 302 or system 1300, which is not within OS 1306. That is, application 1302 is not part of any operating system of OS 1306 installed at system 1300. Application 1302 may include an application UI 1304 that is provided via display 1314 during execution of application 1302. Application 1302 may be stored in a persistent storage of system 1300, and may be loaded into an execution memory for executing by a processor.

Application 1302 may be any type of application installed at a client device, such as client device 302 or system 1300, which is not within OS 1306. That is, application 1302 is not part of any operating system of OS 1306 installed at system 1300. Application 1302 may include an application UI 1304 that is provided via display 1314 during execution of application 1302. As a non-limiting, illustrative example, application 1302 may be a word processing program or an electronic mail program that includes a UI, as would be understood by persons of skill in the relevant art(s) having the benefit of this disclosure. It is also contemplated that more than one application 1302 may be stored at system 1300 in embodiments.

Problem set 1312 may be a list or other data structure that includes a set of known problems which may occur for system 1300. Problem set 1312 may be persistently stored in a storage of 1300. Problem set 1312 may include any problems or problem types as described herein. For example, problem set 1312 may include without limitation problems for user credential issues, uninstalled updates that are available, error codes generated by executing software applications such as application 1302, and/or the like. In embodiments, known problems in problem set 1312 may be associated with application 1302. In other words, each application 1302 may have an associated problem set 1312 that links problems to diagnostics packages.

Diagnostics package 1308 may be any type of diagnostics package stored locally or remotely with respect to a client device, such as client device 302 or system 1300. Diagnostics package 1308 may include a diagnostics package UI 1310 provided via display 1314 during execution of diagnostics package 1308. That is, diagnostics package UI 1310 is a separate, independent UI with respect to any UIs of OS 1306 and application UI 1304. Diagnostics package 1308 may be stored in a persistent storage of system 1300, and may be loaded into an execution memory for executing by a processor through an execution engine as described herein.

While only diagnostics package 1308 is shown for illustration, it is contemplated that more than one diagnostics package 1308 may be stored at system 1300 in embodiments. For example, there may be a number of diagnostics packages 1308 that corresponds to the number of known problems in problem set 1312.

Referring now to FIG. 14, a flowchart 1400 for configurable and proactive application diagnostics and recovery is shown, according to an example embodiment. System 1300 of FIG. 13 may operate according to flowchart 1400. Further structural and operational examples will be apparent to persons skilled in the relevant art(s) based on the following description. Flowchart 1400 is described as follows with respect to system 1300 of FIG. 13.

Flowchart 1400 begins at step 1402. In step 1402, a problem for an executing software application at the processing device is determined by the executing software application, the executing software application having a first user interface (UI) associated therewith. For example, application 1302 may be configured to determine that a problem related thereto exists at system 1300. The determined problem may be one of a set of known problems, e.g., as listed in problem set 1312. Application UI 1304 is associated with application 1302 as described above.

In step 1404, a diagnostics package for the problem is executed by the executing software application. For instance, Application 1302 may be configured to invoke, or cause to be invoked, an execution engine configured to execute diagnostics packages such as diagnostics package 1308. Diagnostics package 1308 may be determined based on a comparison of the determined problem from step 1402 with problem set 1312.

In step 1406, the executing software application is changed to an inactive state during execution of the diagnostics package. For example, execution of diagnostics package 1308 may cause application 1302 to become inactive while executing diagnostics package 1308 becomes active.

In step 1408, a second UI associated with the diagnostics package is provided by the diagnostics package. For instance, as described above, diagnostics package UI 1310 is associated with diagnostics package 1308 and may be provided thereby for display and user interaction/inputs via display 1314.

In step 1410, a consent of a user is requested and received via the second UI to execute a diagnostic action of the diagnostic package. For example, diagnostics package UI 1310 may be configured to provide a prompt and/or a selectable option or object for the customer/user to provide consent to perform a diagnostic action by executing diagnostics package 1308. In such an example, a customer/user provides one or more inputs that indicate their consent to execute diagnostics package 1308 and perform the diagnostic action.

In step 1412, user information associated with the problem requested and received via the second UI. For instance, in some embodiments, user input may be required to perform the diagnostic action for which consent is provided in step 1410. One such example is a problem for expiration or provision of customer/user credentials or authentication information. Diagnostics package UI 1310 may be configured to provide a prompt and/or a selectable option or object for the customer/user to provide such user information that is received upon entry via diagnostics package UI 1310.

In step 1414, the diagnostic action is performed based at least on receiving the consent via the second UI or also based on the user information. For example, diagnostics package 1308 may be executed to perform its associated diagnostic action. Execution may be responsive to the consent being provided and may include utilization of the user information as described above in step 1412. Execution may be performed by an execution engine as described herein, which may run subsequent to the consent being provided.

In step 1416, the second UI is closed subsequent to receiving the consent. For instance, at some time after consent is provided, diagnostics package UI 1310 may be closed. In some embodiments, diagnostics package UI 1310 may be closed responsive to the consent being provided, e.g., for problems that do not require user information, while in other embodiments, diagnostics package UI 1310 may be closed responsive to the user information being provided. In still other examples, diagnostics package UI 1310 may be closed responsive to the end of execution of diagnostics package 1308. Prior to diagnostics package UI 1310 closing, an indication of the result for the performance of the diagnostic action associated with diagnostics package 1308 may be provided to the customer/user via diagnostics package UI 1310.

In step 1418, the executing software application is returned to an active state subsequent to performing the diagnostic action. For example, after diagnostics package 1308 is executed and performance of the associated diagnostic action is complete, control may be passed back to application 1302 causing it to change to an active state.

In flowchart 1400 according to some embodiments, the result of the execution may indicate that the problem was not fixed, or that an additional problem has been detected. In such cases, additional diagnostics packages may be executed. For instance, another local diagnostics package 1308 may be executed, or remote diagnostics packages may be requested and retrieved as described herein, e.g., as in flowchart 900 of FIG. 9.

3. Automatic Diagnoses with Implied Initial Consent

It is contemplated herein that a locally stored diagnostics package may be automatically executed to diagnose known types of problems based on invoking a help application where the invocation serves as the consent of the customer/user for the diagnosis. A relatively small diagnostics package or number of diagnostics packages may be executed in embodiments to quickly perform automatic diagnoses for known problems according to embodiments.

FIG. 15 shows a block diagram of a diagnostics package 1500 for configurable and proactive application diagnostics and recovery, according to an example embodiment. Diagnostics package 1500 may be an embodiment of a locally stored diagnostics package of diagnostics package(s) 322 of FIG. 3. Diagnostics package 1500 is described as follows.

Diagnostics package 1500 includes diagnostic action code 1502 and a list of additional diagnostics packages 1504 ("list 1504"). Diagnostics package 1500 may be configured to automatically perform diagnoses to detect a set of predetermined types of problems at a computing device, e.g., client device 302 of FIG. 3. Diagnostics package 1500 may be executable by an execution engine through execution manager 310 as described herein.

Diagnostic action code 1502 may include at least one portion of code to diagnose a problem in the set of predetermined types of problems at a computing system such as client device 302, and may also include code utilized for performance of diagnostic actions to fix diagnosed problems. This code may comprise, without limitation, a diagnostic action location or path, a diagnostic action identifier, etc.

List 1504 may include a list of diagnostics packages configured to handle for fix the set of predetermined types of problems. For instance, diagnostics package 1500 may be configured to diagnose a problem corresponding to one of the set of predetermined types of problems and also include a listing of other diagnostics packages to fix diagnosed problems. List 1504 may also include additional diagnostic actions code 1506. In embodiments, each diagnostics package entry in list 1504 may have one or more instances of additional diagnostic action code associated therewith. Diagnostic actions code 1506 may include code utilized for performance of diagnostic actions when a corresponding diagnostics package in list 1504 is executed. This code may comprise, without limitation, a diagnostic action location or path, a diagnostic action identifier, etc.

Referring now to FIG. 16, a flowchart 1600 for configurable and proactive application diagnostics and recovery is shown, according to an example embodiment. System 300 of FIG. 3 and diagnostics package 1500 may operate according to flowchart 1600. Further structural and operational examples will be apparent to persons skilled in the relevant art(s) based on the following description. Flowchart 1600 is described as follows with respect to system 300 of FIG. 3 and diagnostics package 1500 of FIG. 15.

Flowchart 1600 begins at step 1602. In step 1602, a request is received from a user to execute a help application at a computing system. For instance, client device 302 may receive a request from a customer/user to execute help application 316. The user may desire to initiate a diagnostics session for a problem at client device 302, may desire to browse help pages or frequently asked questions through help application 316, and/or the like.

In step 1604, execution of the help application for a diagnostic session at the computing system is initiated based at least on the request. For example, based on the user request in step 1602, help application 316 begins to launch and execute.

In step 1606, a local diagnostics package is executed automatically by the help application for the diagnostics session, the local diagnostics package configured to detect a set of predetermined types of problems with the computing system. For instance, help application 316 may immediately, or approximately immediately, after its invocation execute a diagnostics package such as diagnostics package 1500 of FIG. 15. That is, help application 316 may execute diagnostics package 1500 as soon as possible or as one of the first operations it performs, after help application 316 loads and is running. Diagnostics package 1500 may be executable by an execution engine through execution manager 310 as described herein.

In embodiments, the invocation of help application 316 may be an implied consent to execute diagnostics package 1500 for performing an initial diagnostic action via diagnostic action code 1502 to diagnose/detect if one of a set of predetermined types of problems is currently present at client device 302.

In step 1608, it is determined that one of the set of predetermined types of problems exists at the computing system. For example, diagnostic action code 1502 executed by diagnostics package 1500 may provide a result thereof with information indicating the presence of one of the set. Service manager 308 and/or help application 316 of FIG. 3 may be configured to compare the result with expected results of diagnostics package 1500 (e.g., context rules, or the like) to determine the presence of one of the set.

In step 1610, a notification is provided to the user requesting a consent to perform one or more diagnostic actions in the diagnostics session for the one of the set of predetermined types of problems, and the consent is receive from the user. For instance, help application 316 may provide a notification to the customer/user via a UI of UI(s) 318. The UI may be provided for display to the customer/user as part of the execution/launch of help application 316. In embodiments, step 1606 and step 1608 may be performed quickly, e.g., based on diagnostics package 1500 being lightweight and having a relatively short execution time for diagnosis, such that the notification is provided to the customer/user as their interaction with the UI begins or shortly after their interaction begins.

The notification that is provided via the UI may prompt the customer/user for consent to perform a diagnostic action(s) as part of a diagnostics session for the detected problem. That is, performance of further diagnostic actions and/or execution of further diagnostics packages may require explicit consent of the customer/user which is prompted by the notification. The customer/user may provide this consent via the UI as similarly described above, e.g., with respect to step 1410 of flowchart 1400 of FIG. 14.

In step 1612, a diagnostic action corresponding to the one of the set of predetermined types of problems is determined, and the diagnostic action is performed in the diagnostics session. For example, diagnostic action code 1502 of diagnostics package 1500 may be executed to perform the corresponding diagnostic action as similarly described elsewhere herein, such as utilizing an execution engine.

Step 1612 may optionally include step 1614. In step 1614, an additional local diagnostics package that corresponds to the diagnostic action is determined from a list stored with the diagnostics package, and the additional diagnostics package is executed to perform the diagnostic action. For instance, the diagnostics package corresponding to a detected problem/type of the set may be stored as one of additional diagnostics packages in list 1504, described above. In such cases, this diagnostics package may be executed to perform the diagnostic action through additional diagnostic actions code 1506.

Flowchart 1600 may further include one or more steps corresponding to flowchart 900 of FIG. 9 in embodiments for acquiring and executing additional, remote diagnostics packages for determined problems.

Furthermore, it is contemplated herein that an OS of client device 302 may periodically execute help application as a background process to execute diagnostics package 1500, or directly invoke diagnostics package 1500, to execute diagnostic action code 1502 for performing the corresponding diagnostic action.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including, such as system 100 of FIG. 1, system 200 of FIG. 2, system 300 of FIG. 3, system 800 of FIG. 8, system 1000 of FIG. 10, system 1300 of FIG. 13, and diagnostics package 1500 of FIG. 15, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

FIG. 17 is a block diagram of an exemplary mobile system 1700 that includes a mobile device 1702 that may implement embodiments described herein. For example, mobile device 1702 may be used to implement any system, client, or device, or components/subcomponents thereof, in the preceding sections. As shown in FIG. 17, mobile device 1702 includes a variety of optional hardware and software components. Any component in mobile device 1702 can communicate with any other component, although not all connections are shown for ease of illustration. Mobile device 1702 can be any of a variety of computing devices (e.g., cell phone, smart phone, handheld computer, Personal Digital Assistant (PDA), etc.) and can allow wireless two-way communications with one or more mobile communications networks 1704, such as a cellular or satellite network, or with a local area or wide area network.

Mobile device 1702 can include a controller or processor 1710 (e.g., signal processor, microprocessor, ASIC, or other control and processing logic circuitry) for performing such tasks as signal coding, data processing, input/output processing, power control, and/or other functions. An operating system 1712 can control the allocation and usage of the components of mobile device 1702 and provide support for one or more application programs 1714 (also referred to as "applications" or "apps"). Application programs 1714 may include common mobile computing applications (e.g., e-mail applications, calendars, contact managers, web browsers, messaging applications) and any other computing applications (e.g., word processing applications, mapping applications, media player applications).

Mobile device 1702 can include memory 1720. Memory 1720 can include non-removable memory 1722 and/or removable memory 1724. Non-removable memory 1722 can include RAM, ROM, flash memory, a hard disk, or other well-known memory devices or technologies. Removable memory 1724 can include flash memory or a Subscriber Identity Module (SIM) card, which is well known in GSM communication systems, or other well-known memory devices or technologies, such as "smart cards." Memory 1720 can be used for storing data and/or code for running operating system 1712 and application programs 1714. Example data can include web pages, text, images, sound files, video data, or other data to be sent to and/or received from one or more network servers or other devices via one or more wired or wireless networks. Memory 1720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1720. These programs include operating system 1712, one or more application programs 1714, and other program modules and program data. Examples of such application programs or program modules may include, for example, computer program logic (e.g., computer program code or instructions) for implementing one or more of system 100 of FIG. 1, system 200 of FIG. 2, system 300 of FIG. 3, system 800 of FIG. 8, system 1000 of FIG. 10, system 1300 of FIG. 13, and diagnostics package 1500 of FIG. 15, along with any components and/or subcomponents thereof, as well any operations and portions of flowcharts/flow diagrams described herein and/or further examples described herein.

Mobile device 1702 can support one or more input devices 1730, such as a touch screen 1732, a microphone 1734, a camera 1736, a physical keyboard 1738 and/or a trackball 1740 and one or more output devices 1750, such as a speaker 1752 and a display 1754. Other possible output devices (not shown) can include piezoelectric or other haptic output devices. Some devices can serve more than one input/output function. For example, touch screen 1732 and display 1754 can be combined in a single input/output device. Input devices 1730 can include a Natural User Interface (NUI).

One or more wireless modems 1760 can be coupled to antenna(s) (not shown) and can support two-way communications between processor 1710 and external devices, as is well understood in the art. Modem 1760 is shown generically and can include a cellular modem 1766 for communicating with the mobile communication network 1704 and/or other radio-based modems (e.g., Bluetooth 1764 and/or Wi-Fi 1762). At least one wireless modem 1760 is typically configured for communication with one or more cellular networks, such as a GSM network for data and voice communications within a single cellular network, between cellular networks, or between the mobile device and a public switched telephone network (PSTN).

Mobile device 1702 can further include at least one input/output port 1780, a power supply 1782, a satellite navigation system receiver 1784, such as a Global Positioning System (GPS) receiver, an accelerometer 1786, and/or a physical connector 1790, which can be a USB port, IEEE 1394 (FireWire) port, and/or RS-232 port. The illustrated components of mobile device 1702 are not required or all-inclusive, as any components can be deleted and other components can be added as would be recognized by one skilled in the art.

In an embodiment, mobile device 1702 is configured to implement any of the above-described features of flowcharts/embodiments herein. Computer program logic for performing any of the operations, steps, and/or functions described herein may be stored in memory 1720 and executed by processor 1710.

FIG. 18 depicts an exemplary implementation of a computing device 1800 in which embodiments may be implemented. For example, embodiments described herein may be implemented in one or more computing devices similar to computing device 1800 in stationary or mobile computer embodiments, including one or more features of computing device 1800 and/or alternative features. The description of computing device 1800 provided herein is provided for purposes of illustration, and is not intended to be limiting. Embodiments may be implemented in further types of computer systems and/or game consoles, etc., as would be known to persons skilled in the relevant art(s).

As shown in FIG. 18, computing device 1800 includes one or more processors, referred to as processor circuit 1802, a system memory 1804, and a bus 1806 that couples various system components including system memory 1804 to processor circuit 1802. Processor circuit 1802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1802 may execute program code stored in a computer readable medium, such as program code of operating system 1830, application programs 1832, other programs 1834, etc. Bus 1806 represents one or more of any of several types of bus structures, including a memory bus or memory controller, a peripheral bus, an accelerated graphics port, and a processor or local bus using any of a variety of bus architectures. System memory 1804 includes read only memory (ROM) 1808 and random access memory (RAM) 1810. A basic input/output system 1812 (BIOS) is stored in ROM 1808.

Computing device 1800 also has one or more of the following drives: a hard disk drive 1814 for reading from and writing to a hard disk, a magnetic disk drive 1816 for reading from or writing to a removable magnetic disk 1818, and an optical disk drive 1820 for reading from or writing to a removable optical disk 1822 such as a CD ROM, DVD ROM, or other optical media. Hard disk drive 1814, magnetic disk drive 1816, and optical disk drive 1820 are connected to bus 1806 by a hard disk drive interface 1824, a magnetic disk drive interface 1826, and an optical drive interface 1828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1830, one or more application programs 1832, other programs 1834, and program data 1836. Application programs 1832 or other programs 1834 may include, for example, computer program logic (e.g., computer program code or instructions) for implementing embodiments described herein, such as system 100 of FIG. 1, system 200 of FIG. 2, system 300 of FIG. 3, system 800 of FIG. 8, system 1000 of FIG. 10, system 1300 of FIG. 13, and diagnostics package 1500 of FIG. 15, along with any components and/or subcomponents thereof, as well any operations and portions of flowcharts/flow diagrams described herein and/or further examples described herein.

A user may enter commands and information into the computing device 1800 through input devices such as keyboard 1838 and pointing device 1840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1802 through a serial port interface 1842 that is coupled to bus 1806, but may be connected by other interfaces, such as a parallel port, game port, or a universal serial bus (USB).

A display screen 1844 is also connected to bus 1806 via an interface, such as a video adapter 1846. Display screen 1844 may be external to, or incorporated in computing device 1800. Display screen 1844 may display information, as well as being a user interface for receiving user commands and/or other information (e.g., by touch, finger gestures, virtual keyboard, etc.). In addition to display screen 1844, computing device 1800 may include other peripheral output devices (not shown) such as speakers and printers.

Computing device 1800 is connected to a network 1848 (e.g., the Internet) through an adaptor or network interface 1850, a modem 1852, or other means for establishing communications over the network. Modem 1852, which may be internal or external, may be connected to bus 1806 via serial port interface 1842, as shown in FIG. 18, or may be connected to bus 1806 using another interface type, including a parallel interface.

As used herein, the terms "computer program medium," "computer-readable medium," and "computer-readable storage medium," etc., are used to refer to physical hardware media such as the hard disk associated with hard disk drive 1814, removable magnetic disk 1818, removable optical disk 1822, other physical hardware media such as RAMs, ROMs, flash memory cards, digital video disks, zip disks, MEMs, nanotechnology-based storage devices, and further types of physical/tangible hardware storage media (including memory 1820 of FIG. 18). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1832 and other programs 1834) may be stored on the hard disk, magnetic disk, optical disk, ROM, RAM, or other hardware storage medium. Such computer programs may also be received via network interface 1850, serial port interface 1842, or any other interface type. Such computer programs, when executed or loaded by an application, enable computing device 1800 to implement features of embodiments discussed herein. Accordingly, such computer programs represent controllers of the computing device 1800.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions. In embodiments, one or more of the steps or operations of any operation, process, flowchart, and/or flow diagram described herein may not be performed. Moreover, steps or operations in addition to or in lieu of those in any operation, process, flowchart, and/or flow diagram described herein may be performed. Further, in examples, one or more operations of any operation, process, flowchart, and/or flow diagram described herein may be performed out of order, in an alternate sequence, or partially (or completely) concurrently with each other or with other operations.

The described embodiments herein for configurable and proactive application diagnostics and recovery improve system efficiency. For example, as noted above, migrated diagnostics packages may be selectively chosen based on frequency of associated problems over a large customer/user base to balance memory usage at client devices for storing the diagnostics packages against increased availability of diagnostics packages, faster request-to-execution time for diagnostics packages (e.g., reduced processing cycles and power consumption), and decreased network bandwidth/host load utilizations for communications between clients and hosts for determining and providing diagnostics packages.

Additionally, time to diagnose and fix problems using remote diagnostics packages is reduced by automatically determining, providing, and applying diagnostics packages in a single session based on a single user consent. Accordingly, because problems at client devices are diagnosed and fixed more quickly, the performance and the functionality of the client devices is improved.

Moreover, UI improvements are realized by providing embodiments for self-contained diagnostics package UIs such that diagnostics packages may be flexibly and natively invoked from different applications outside of operating systems while still efficiently providing the ability to receive user consent to perform diagnostic actions at client devices. Still further, the diagnostics functions described herein may be provided different applications, e.g., third party applications, thus increasing security for handling problems of these applications at least because the described diagnostics capabilities herein have access to more permissions than such applications, according to embodiments. For instance, the described embodiments can ensure that diagnostics packages have been signed by an appropriate signature(s), fit into the framework described herein, etc.

Furthermore, the described embodiments do not exist in software implementations for configurable and proactive application diagnostics and recovery. That is, the current state of the art lacks the flexibility and extensibility for the embodiments described herein, e.g., automatically determining, providing, and applying diagnostics packages in a single session based on a single user consent, providing diagnostics package UIs, automatic diagnoses upon launch of help applications, hybrid local-remote diagnostic sessions through device-specific and/or device-bound tokens, etc.

Embodiments herein also reduce human support agent/engineer engagements around highly repetitive scenarios that can be automatically diagnosed in single continuous sessions and enable more self-help scenarios for customers/users, maintain the ability of virtual agents to run diagnostics, collect results, and follow up with corrective actions for support issues automatically, and provide developers a clear framework to define and manage diagnostic packages and run them via virtual agent/help application where diagnostics packages are easily authored, published, and delivered for specific diagnostics solutions.

The additional examples and embodiments described in this Section may be applicable to examples disclosed in any other Section or subsection of this disclosure.

Systems, devices, and methods for configurable and proactive application diagnostics and recovery, are described herein. For instance, a diagnostics system is described for configurable and proactive application diagnostics and recovery. The diagnostics system includes a processing system comprising one or more processors and a memory configured to store program code to be executed by the processing system. The program code includes a diagnostics manager. The diagnostics manager is configured to receive client context information provided by a help application of a client device, and a type of a problem and a session initiation indication for a diagnostics session provided by a support host. The diagnostics manager is also configured to filter a diagnostics database based at least on the type and the client context information, and to determine a diagnostics package, based on the filtering, that corresponds to a diagnostic action for the type and for the client context information. The diagnostics manager is further configured to generate a session identifier to identify the diagnostics session and retrieve a diagnostics identifier to identify at least one of the diagnostic action or the diagnostics package, and to provide the session identifier and the diagnostics identifier to the help application via the support host. The diagnostics manager is further configured to receive a request including the session identifier and the diagnostics identifier from a service manager of the client device that is configured to download the diagnostics package to the client device, and to provide a location identifier for the diagnostics package to the service manager.

In an embodiment of the diagnostics system, the type of the problem includes at least a problem key and a problem value, the problem key being one of an issue type or an error code, and the problem value specifying a descriptor for the problem key.

In an embodiment of the diagnostics system, to filter the diagnostics database, the diagnostics manager is configured to retrieve a listing of diagnostics packages and diagnostic actions having metadata associated therewith from the diagnostics database, where the metadata includes at least one of a diagnostics package name, a diagnostics package description, an author, a version, a creation date, a help article identifier, an expected type for problems, client device information, a result key identifier, or a result key description. In the embodiment, the diagnostics manager is also configured to analyze sets of context rules for each entry in the listing against the client context information and the type.

In an embodiment of the diagnostics system, to determine the diagnostics package, the diagnostics manager is configured to determine at least one matching diagnostics package-action pair for which the corresponding set of context rules is met by the client context information and the type, and to select the diagnostics package as being associated with the at least one matching diagnostics package-action pair.

In an embodiment of the diagnostics system, the program code further includes a software as a service (SaaS) platform. The SaaS platform is configured to receive the client context information and a request for a diagnostics session from the help application of the client device, the request for the diagnostics session including a description the problem and an identity token, and to validate the identity token. In the embodiment, the SaaS platform is also configured to obtain a type of the problem utilizing a determination service associated with the SaaS platform, the determination service configured to determine types of problems based at least on the client context information and the description the problem, and to provide the client context information, the type, and the session initiation indication to the diagnostics manager subsequent to validating the identity token.

In the embodiment, the SaaS platform is further configured to receive an indication of a result of the diagnostics package executed at the client device subsequent to its execution, and to provide the indication of the result to the determination service, the determination service being configured to determine the other type of the other problem based at least on the indication of the result and to update a machine learning determination algorithm based at least on the indication of the result. In the embodiment, the SaaS platform is also configured to receive the other type of the other problem from the determination service, and to provide the session identifier, another type of another problem, and a continuation instruction to the diagnostics manager based at least on the indication of the result.

In an embodiment of the diagnostics system, the service manager is configured to invoke a diagnostics engine at the client device to execute the diagnostics package. The diagnostics manager is further configured to receive an indication of a result for the diagnostics package after its execution that includes a result key identifier and a result key description that indicate the problem at the client device is fixed, and store a session results document for the diagnostics session that includes the session identifier and at least one of the diagnostics identifier, the indication, the type, the problem, or the client context information.

In an embodiment of the diagnostics system, the diagnostics manager is further configured to provide a user interface configured to receive inputs from a package developer defining a new diagnostics package and to modify the diagnostics package, digitally sign the new diagnostics package and the modified diagnostics package prior to storage thereof in an unstructured data store, and store new metadata associated with the new diagnostics package and modified metadata associated with the modified diagnostics package in the diagnostics database. In the embodiment, the diagnostics manager is further configured to delete existing diagnostics packages.

A method performed by a diagnostics system is also described. In embodiments, the method is for configurable and proactive application diagnostics and recovery, and may be performed by systems and/or devices herein. The method includes determining a diagnostics package having a diagnostic action associated therewith for a diagnostics session based at least on client context information provided from a help application of a client device and a type of a problem of the client device, and providing a session identifier and a diagnostics identifier of the diagnostics package to the help application via a support host. The method also includes receiving an execution initiation instruction, that specifies the session identifier for the diagnostics session and the diagnostics identifier, from a service manager of the client device, obtaining a location identifier for the diagnostics package that was determined, and providing the location identifier for the diagnostics package to the service manager and causing the service manager to retrieve the diagnostics package according to the location identifier and invoke a diagnostics engine at the client device to execute the diagnostics package.

In an embodiment of the method, the execution initiation instruction comprises a request for the diagnostics identifier. In the embodiment, obtaining the location identifier includes providing a request for the diagnostics identifier to an unstructured data store associated with the diagnostics system that is accessible by the service manager of the client device, and receiving the diagnostics identifier from the unstructured data store.

In an embodiment of the method, the location identifier is valid for a predetermined period of time and comprises a uniform resource locator (URL) or a uniform resource identifier (URI).

In an embodiment, the method includes receiving an indication of a result for the diagnostics package after its execution that indicates an additional diagnostics remediation is needed at the client device, determining another diagnostics package that corresponds to another diagnostic action based on the result, and providing another location identifier of the other diagnostics package to the service manager for execution of the other diagnostic action in the diagnostics session under the session identifier.

In an embodiment of the method, the diagnostics package is configured to diagnose the problem and the other diagnostics package is configured to fix the problem in the diagnostics session under the session identifier.

In an embodiment of the method, the diagnostics package is configured to diagnose and fix the problem and the other diagnostics package is associated with another problem detected at the client device, and determining the other diagnostics package is also based on the client context information from the help application and another type of the other problem.

In an embodiment, the method includes providing the session identifier and another diagnostics identifier of the other diagnostics package for the help application prior to providing the other diagnostics identifier, and providing the other location identifier is based at least on a continuation instruction from the service manager that specifies the session identifier and the other diagnostics identifier.

In an embodiment, the method includes, subsequent to receiving another indication of another result for the other diagnostics package after its execution that indicates the problem is resolved, storing a session results document for the diagnostics session that includes the session identifier and at least one of the diagnostics identifier, the other diagnostics identifier, the indication, the other indication, the type, the problem, or the client context information.

In an embodiment, the method includes receiving a request for the session results document subsequent to said storing, and providing the session results document to a support agent.

A computer-readable storage medium having program instructions recorded thereon that, when executed by a processing device, perform a method for diagnostics services is also provided herein. In embodiments, the computer-readable storage medium and the method are for configurable and proactive application diagnostics and recovery, and may be respectively stored and performed by systems and/or devices herein. The method includes determining client context information for a device of a user, receiving user input at a help application executing at the device, the user input including a problem description of a problem of the device, and providing the client context information and the problem description to a support host. The method also includes invoking a diagnostics execution manager by the help application based at least on receiving at the help application from the support host a session identifier for a diagnostics session and a diagnostics identifier associated with both a diagnostics package and the problem description, the diagnostics execution manager configured to execute diagnostics packages as native actions for the device, and providing the session identifier and the diagnostics identifier from the help application to the diagnostics execution manager. The method further includes invoking by the diagnostics execution manager a download manager configured to provide the diagnostics identifier to a diagnostics host, and receiving a location identifier for the diagnostics package, the location identifier specifying a location at a remote data store. The method further includes retrieving the diagnostics package from the remote data store according to the location identifier, and executing the diagnostics package as a background process and as a native action at the device by the diagnostics execution manager under the session identifier in the diagnostics session.

In an embodiment of the computer-readable storage medium, the method includes providing a result of execution of the diagnostics package to at least one of the diagnostics host or the support host, receiving the session identifier and another diagnostics identifier associated with another diagnostics package at the help application based at least on providing the result, and providing the session identifier and the other diagnostics identifier from the help application to the diagnostics execution manager. In the embodiment, the method also includes, invoking by the diagnostics execution manager the download manager that is further configured to provide the other diagnostics identifier to the diagnostics host, receiving another location identifier for the other diagnostics package, the other location identifier specifying another location at the data store, retrieving the other diagnostics package from the data store according to the other location identifier, and executing the other diagnostics package silently as a native action at the device by the diagnostics execution manager under the session identifier in the diagnostics session.

In an embodiment of the computer-readable storage medium, the method includes authenticating a digital shared access signature of the diagnostics package subsequent to said retrieving and prior to said executing the diagnostics package.

Additional systems, devices, and methods for configurable and proactive application diagnostics and recovery, are also described herein. For instance, another diagnostics system is described for configurable and proactive application diagnostics and recovery. The diagnostics system includes a processing system comprising one or more processors and a memory configured to store program code to be executed by the processing system. The program code includes a service manager. The service manager is configured to be invoked by a help application based on a user being authenticated. The service manager is also configured to execute a local diagnostics package for a problem in a context of the diagnostics system, and transmit an identification token, that identifies the diagnostics system and the user, and a remote diagnostics package request to a remote diagnostics service over a network based at least on first results information associated with the executed local diagnostics package. The service manager is further configured to receive a remote diagnostics package for the problem over the network based at least on the identification token and the remote diagnostics package request, and execute the remote diagnostics package in the context of the diagnostics system.

In an embodiment of the diagnostics system, the program code further includes a diagnostics interface that is configured to transmit to a remote authentication service a token request for the identification token subsequent to invocation of the diagnostics interface by the user, the token request including authentication information associated with the user and the diagnostics system, receive the identification token, and authenticate the user based on the identification token.

In an embodiment of the diagnostics system, the diagnostics interface is configured to include in the remote diagnostics package request the first results information.

In an embodiment of the diagnostics system, the local diagnostics package and the remote diagnostics package are executed in a single diagnostics session by the service manager. The service manager is configured to transmit the identification token and a second remote diagnostics package request with second results information associated with the executed local diagnostics package to the remote diagnostics service over the network based at least on the second results information. The service manager is also configured to receive an additional remote diagnostics package for the diagnostics session over the network based at least on the second results information.

In an embodiment of the diagnostics system, the service manager is configured to transmit second results information associated with the executed remote diagnostics package to the remote diagnostics service over the network.

In an embodiment of the diagnostics system, code for executing a diagnostic action of the remote diagnostics package is stored in the local diagnostics package subsequent to execution of the remote diagnostics package, or wherein the remote diagnostics package is stored with the local diagnostics package as another local diagnostics package at the diagnostics system subsequent to execution of the remote diagnostics package. In the embodiment, the service manager is configured to execute the local diagnostics package that includes the code for executing the diagnostic action based at least on a subsequent diagnostics request of the user, or execute the local diagnostics package and the other local diagnostics package based at least on a subsequent diagnostics request of the user.

In an embodiment of the diagnostics system, one or more of the local diagnostics package or the remote diagnostics package are configured to diagnose the problem for a software application installed at the diagnostics system outside of any operating system of the diagnostics system.

Another computer-readable storage medium having program instructions recorded thereon that, when executed by a processing device, perform a method for diagnostics services is also provided herein. In embodiments, the computer-readable storage medium and the method are for configurable and proactive application diagnostics and recovery, and may be respectively stored and performed by systems and/or devices herein. The method includes determining a problem for an executing software application at the processing device by the executing software application, the executing software application having a first user interface (UI) associated therewith, and executing a diagnostics package for the problem by the executing software application. The method also includes providing by the diagnostics package a second UI associated with the diagnostics package, requesting via the second UI a consent of a user to execute a diagnostic action of the diagnostic package, and performing the diagnostic action based at least on receiving the consent via the second UI.

In an embodiment of the computer-readable storage medium, the second UI is stored within the diagnostics package.

In an embodiment of the computer-readable storage medium, the problem is one of a set of known problems for the executing software application, and the diagnostics package is stored at the processing device.

In an embodiment of the computer-readable storage medium, the set of known problems includes at least one of a user credential issue, an uninstalled update that is available, or an error code generated by the executing software application.

In an embodiment of the computer-readable storage medium, the method further includes requesting via the second UI user information associated with the problem, receiving via the second UI the user information, and performing the diagnostic action also based at least on the user information.

In an embodiment of the computer-readable storage medium, the diagnostics package performs a diagnosis of the problem and determines the problem is outside of a set of known problems for the executing software application based on result information. In the embodiment, the method further includes transmitting a request for a remote diagnostics package associated with the problem, the request for the remote diagnostics package including context information of the processing device and the result information, receiving the remote diagnostics package, and executing the remote diagnostics package at the processing device.

In an embodiment of the computer-readable storage medium, the method further includes receiving input information from the user via the second UI prior to transmitting the request for the remote diagnostics package, the input information being associated with the problem for the executing software application, and the request for the remote diagnostics package also includes the input information.

In an embodiment of the computer-readable storage medium, the method further includes changing the executing software application to an inactive state during execution of the diagnostics package, closing the second UI subsequent to receiving the consent, and returning the executing software application to an active state subsequent to performing the diagnostic action.

Another method for diagnostics services performed by a diagnostics system or device is also described. In embodiments, the method is for configurable and proactive application diagnostics and recovery, and may be performed by systems and/or devices herein. The method includes receiving a request from a user to execute a help application at a computing system, initiating execution of the help application for a diagnostic session at the computing system based at least on the request, and executing automatically a local diagnostics package by the help application for the diagnostics session, the local diagnostics package configured to detect a set of predetermined types of problems with the computing system. The method further includes determining that one of the set of predetermined types of problems exists at the computing system, and providing a notification to the user requesting a consent to perform one or more diagnostic actions in the diagnostics session for the one of the set of predetermined types of problems.

In an embodiment, the method includes receiving the consent from the user, determining a diagnostic action corresponding to the one of the set of predetermined types of problems, and performing the diagnostic action in the diagnostics session.

In an embodiment of the method, the local diagnostics package includes code for executing the diagnostic action. In an embodiment of the method, the local diagnostics package includes a list of additional local diagnostics packages, and the method further includes determining one of the additional local diagnostics packages that corresponds to the diagnostic action from the list, and executing the one of the additional local diagnostics packages for performing the diagnostic action.

In an embodiment, the method includes generating result information from the performed diagnostic action, and determining an additional diagnostic action is required based on the result information. In the embodiment, the method also includes transmitting a request for a remote diagnostics package associated with the additional diagnostic action, the request for the remote diagnostics package including context information of the computing system and the result information, receiving the remote diagnostics package, and executing the remote diagnostics package at the computing system.

In an embodiment, the method includes receiving user input at the help application, the user input including a problem description of a user-identified problem of the computing system, providing the client context information and the problem description to a support host, and invoking a diagnostics execution manager by the help application based at least on receiving from the support host at the help application a session identifier for a diagnostics session and a diagnostics identifier associated with both a diagnostics package and the problem description, the diagnostics execution manager being configured to execute diagnostics packages as native actions for the device. In the embodiment, the method also includes providing the session identifier and the diagnostics identifier from the help application to the diagnostics execution manager, invoking by the diagnostics execution manager a download manager configured to provide the diagnostics identifier to a diagnostics host, and receiving a location identifier for the diagnostics package, the location identifier specifying a location at remote a data store. In the embodiment, the method also includes retrieving the diagnostics package from the remote data store according to the location identifier, and executing the diagnostics package as a background process and as a native action at the device by the diagnostics execution manager under the session identifier in the diagnostics session.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A diagnostics system comprising:
   a processing system comprising one or more processors; and
   a memory configured to store program code to be executed by the processing system, the program code including:
   a diagnostics manager configured to:
      receive client context information provided by a help application of a client device, and a type of a problem and a session initiation indication for a diagnostics session provided by a support host;
      filter a diagnostics database based at least on the type and the client context information;

determine a diagnostics package, based on the filtering, that corresponds to a diagnostic action for the type and for the client context information;
generate a session identifier to identify the diagnostics session and retrieve a diagnostics identifier to identify at least one of the diagnostic action or the diagnostics package;
provide the session identifier and the diagnostics identifier to the help application via the support host;
receive a request including the session identifier and the diagnostics identifier from a service manager of the client device that is configured to download the diagnostics package to the client device; and
provide a location identifier for the diagnostics package to the service manager that enables the service manager to locate the diagnostics package for download to the client device and execution as part of the diagnostics session.

2. The diagnostics system of claim 1, wherein the type of the problem includes at least a problem key and a problem value, the problem key being one of an issue type or an error code, and the problem value specifying a descriptor for the problem key.

3. The diagnostics system of claim 1, wherein, to filter the diagnostics database, the diagnostics manager is configured to:
retrieve a listing of diagnostics packages and diagnostic actions having metadata associated therewith from the diagnostics database, wherein the metadata includes at least one of:
a diagnostics package name, a diagnostics package description, an author, a version, a creation date, a help article identifier, an expected type for problems, client device information, a result key identifier, or a result key description; and
analyze sets of context rules for each entry in the listing against the client context information and the type.

4. The diagnostics system of claim 3, wherein, to determine the diagnostics package, the diagnostics manager is configured to:
determine at least one matching diagnostics package-action pair for which the corresponding set of context rules is met by the client context information and the type; and
select the diagnostics package as being associated with the at least one matching diagnostics package-action pair.

5. The diagnostics system of claim 1, the program code further comprising a software as a service (SaaS) platform that is configured to:
receive the client context information and a request for a diagnostics session from the help application of the client device, the request for the diagnostics session including a description the problem and an identity token;
validate the identity token;
obtain a type of the problem utilizing a determination service associated with the SaaS platform, the determination service configured to determine types of problems based at least on the client context information and the description the problem; and
provide the client context information, the type, and the session initiation indication to the diagnostics manager subsequent to validating the identity token.

6. The diagnostics system of claim 5, wherein the SaaS platform is further configured to:

receive an indication of a result of the diagnostics package executed at the client device subsequent to its execution;
provide the indication of the result to the determination service, the determination service configured to determine the other type of the other problem based at least on the indication of the result and to update a machine learning determination algorithm based at least on the indication of the result;
receive the other type of the other problem from the determination service; and
provide the session identifier, another type of another problem, and a continuation instruction to the diagnostics manager based at least on the indication of the result.

7. The diagnostics system of claim 1, wherein the service manager is configured to invoke a diagnostics engine at the client device to execute the diagnostics package; and
wherein the diagnostics manager is further configured to:
receive an indication of a result for the diagnostics package after its execution that includes a result key identifier and a result key description that indicate the problem at the client device is fixed; and
store a session results document for the diagnostics session that includes the session identifier and at least one of:
the diagnostics identifier,
the indication,
the type,
the problem, or
the client context information.

8. The diagnostics system of claim 1, wherein the diagnostics manager is further configured to:
provide a user interface configured to receive inputs from a package developer defining a new diagnostics package and to modify the diagnostics package;
digitally sign the new diagnostics package and the modified diagnostics package prior to storage thereof in an unstructured data store;
store new metadata associated with the new diagnostics package and modified metadata associated with the modified diagnostics package in the diagnostics database; and
delete existing diagnostics packages.

9. A method performed by a diagnostics system, the method comprising:
determining a diagnostics package having a diagnostic action associated therewith for a diagnostics session based at least on client context information provided from a help application of a client device and a type of a problem of the client device;
providing a session identifier and a diagnostics identifier of the diagnostics package to the help application via a support host;
receiving an execution initiation instruction, that specifies the session identifier for the diagnostics session and the diagnostics identifier, from a service manager of the client device;
obtaining a location identifier for the diagnostics package that was determined; and
providing the location identifier for the diagnostics package to the service manager and causing the service manager to retrieve the diagnostics package according to the location identifier and invoke a diagnostics engine at the client device to execute the diagnostics package.

10. The method of claim 9, wherein the execution initiation instruction comprises a request for the diagnostics identifier; and
wherein obtaining the location identifier includes:
provoiding a request for the diagnostics identifier to an unstructured data store associated with the diagnostics system that is accessible by the service manager of the client device; and
receiving the diagnostics identifier from the unstructured data store.

11. The method of claim 10, wherein the location identifier is valid for a predetermined period of time and comprises a uniform resource locator (URL) or a uniform resource identifier (URI).

12. The method of claim 9, further comprising:
receiving an indication of a result for the diagnostics package after its execution that indicates an additional diagnostics remediation is needed at the client device;
determining another diagnostics package that corresponds to another diagnostic action based on the result; and
providing another location identifier of the other diagnostics package to the service manager for execution of the other diagnostic action in the diagnostics session under the session identifier.

13. The method of claim 12, wherein the diagnostics package is configured to diagnose the problem and the other diagnostics package is configured to fix the problem in the diagnostics session under the session identifier.

14. The method of claim 12, wherein the diagnostics package is configured to diagnose and fix the problem and the other diagnostics package is associated with another problem detected at the client device; and
wherein determining the other diagnostics package is also based on the client context information from the help application and another type of the other problem.

15. The method of claim 14, wherein the method further comprises:
providing the session identifier and another diagnostics identifier of the other diagnostics package for the help application prior to providing the other diagnostics identifier; and
wherein providing the other location identifier is based at least on a continuation instruction from the service manager that specifies the session identifier and the other diagnostics identifier.

16. The method of claim 12, wherein the method further comprises:
subsequent to receiving another indication of another result for the other diagnostics package after its execution that indicates the problem is resolved, storing a session results document for the diagnostics session that includes the session identifier and at least one of:
the diagnostics identifier,
the other diagnostics identifier,
the indication,
the other indication,
the type,
the problem, or
the client context information.

17. The method of claim 16, wherein the method further comprises:
receiving a request for the session results document subsequent to said storing; and
providing the session results document to a support agent.

18. A computer-readable storage medium having program instructions recorded thereon that, when executed by a processing device, perform a method for diagnostics services, the method comprising:
determining client context information for a device of a user;
receiving user input at a help application executing at the device, the user input including a problem description of a problem of the device;
providing the client context information and the problem description to a support host;
invoking a diagnostics execution manager by the help application based at least on receiving at the help application from the support host a session identifier for a diagnostics session and a diagnostics identifier associated with both a diagnostics package and the problem description, the diagnostics execution manager configured to execute diagnostics packages as native actions for the device;
providing the session identifier and the diagnostics identifier from the help application to the diagnostics execution manager;
invoking by the diagnostics execution manager a download manager configured to provide the diagnostics identifier to a diagnostics host;
receiving a location identifier for the diagnostics package, the location identifier specifying a location at a remote data store;
retrieving the diagnostics package from the remote data store according to the location identifier; and
executing the diagnostics package as a background process and as a native action at the device by the diagnostics execution manager under the session identifier in the diagnostics session.

19. The computer-readable storage medium of claim 18, wherein the method further comprises:
providing a result of execution of the diagnostics package to at least one of the diagnostics host or the support host;
receiving the session identifier and another diagnostics identifier associated with another diagnostics package at the help application based at least on providing the result;
providing the session identifier and the other diagnostics identifier from the help application to the diagnostics execution manager;
invoking by the diagnostics execution manager the download manager that is further configured to provide the other diagnostics identifier to the diagnostics host;
receiving another location identifier for the other diagnostics package, the other location identifier specifying another location at the data store;
retrieving the other diagnostics package from the data store according to the other location identifier; and
executing the other diagnostics package silently as a native action at the device by the diagnostics execution manager under the session identifier in the diagnostics session.

20. The computer-readable storage medium of claim 18, wherein the method further comprises:
authenticating a digital shared access signature of the diagnostics package subsequent to said retrieving and prior to said executing the diagnostics package.

* * * * *